US012718650B2

United States Patent
(12) United States Patent
Nelson et al.

(10) Patent No.: US 12,718,650 B2
(45) Date of Patent: Aug. 25, 2026

(54) ARTIFICIAL INTELLIGENCE GENERATED CENTRAL DETERMINATION CONTENT

(71) Applicant: IGT, Las Vegas, NV (US)

(72) Inventors: Dwayne Nelson, Las Vegas, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 127 days.

(21) Appl. No.: 18/793,015

(22) Filed: Aug. 2, 2024

(65) Prior Publication Data

US 2026/0038327 A1 Feb. 5, 2026

(51) Int. Cl.
*G07F 17/32* (2006.01)

(52) U.S. Cl.
CPC ........ *G07F 17/3211* (2013.01); *G07F 17/326* (2013.01)

(58) Field of Classification Search
CPC ... G07F 17/3211; G07F 17/326; G07F 17/323
See application file for complete search history.

(56) References Cited

U.S. PATENT DOCUMENTS

| | | | | |
|---|---|---|---|---|
| 7,329,183 | B2 | 2/2008 | Michaelson et al. | |
| 8,147,334 | B2 | 4/2012 | Gatto et al. | |
| 8,579,710 | B2 | 11/2013 | Watkins, Jr. et al. | |
| 8,668,592 | B2 | 3/2014 | Watkins, Jr. et al. | |
| 8,764,566 | B2 | 7/2014 | Miltenberger et al. | |
| 8,777,746 | B2 | 7/2014 | Watkins, Jr. et al. | |
| 8,821,296 | B1 | 9/2014 | Smurfit et al. | |
| 8,882,595 | B2 | 11/2014 | Chowdhary et al. | |
| 8,903,132 | B2 | 12/2014 | Watkins, Jr. et al. | |
| 8,944,910 | B1 | 2/2015 | Boyle | |
| 9,144,739 | B2 | 9/2015 | Wilkinson et al. | |
| 9,545,563 | B2 | 1/2017 | Yim et al. | |
| 10,008,071 | B2 | 6/2018 | Powell et al. | |
| 10,946,284 | B2 | 3/2021 | Chowdhary et al. | |
| 10,997,761 | B2 | 5/2021 | Guzman | |
| 11,890,536 | B2 | 2/2024 | McCoy et al. | |
| 2012/0115581 | A1* | 5/2012 | Englman | G07F 17/34 463/25 |
| 2013/0172064 | A1* | 7/2013 | Bansemer | G07F 17/3293 463/13 |
| 2025/0068893 | A1* | 2/2025 | Bradea | G06N 3/0475 |

OTHER PUBLICATIONS

U.S. Appl. No. 18/442,481, filed Feb. 15, 2024, Nelson et al.
U.S. Appl. No. 18/597,059, filed Mar. 6, 2024, Nelson et al.
(Continued)

*Primary Examiner* — Pegeman Karimi
(74) *Attorney, Agent, or Firm* — Sheridan Ross P.C.

(57) ABSTRACT

The present disclosure relates generally to a gaming system, device, and method that selects a predetermined game outcome from a pool of predetermined game outcomes, generates a prompt to a generative model, the prompt comprising input related to the predetermined game outcome, receives content generated by the generative model based on the generated prompt, selects at least a portion of the received content for presentation as part of a game display configured to provide the selected predetermined game outcome, and causes the received content to be presented by a gaming device as part of the game display.

20 Claims, 13 Drawing Sheets

(56) References Cited

OTHER PUBLICATIONS

U.S. Appl. No. 18/631,527, filed Apr. 10, 2024, Nelson et al.
"Augmented reality," Wikipedia, last edited Feb. 27, 2024, 48 pages [retrieved online Feb. 28, 24 from: en.wikipedia.org/w/index.php?title=Augmented_reality&oldid=1210598682].
"DALL-E," Wikipedia, Updated Dec. 29, 2023, 13 pages [retrieved online May 22, 2024 from: en.wikipedia.org/w/index.php?title=DALL-E&oldid=1192428517].
"Generative AI Models Explained," Data Science, Oct. 12, 2022, 28 pages [retrieved online May 22, 2024 from: www.altexsoft.com/blog/generative-ai/].
"Online casino," Wikipedia, last edited Oct. 7, 2023, 8 pages [retrieved online Feb. 16, 2024 from: en.wikipedia.org/w/index.php?title=Online_casino&oldid=1178993090].
"Online Casinos vs Traditional Land-Based Casinos," servers.com, 2023, 4 pages [retrieved online Feb. 16, 2024 from: www.servers.com/news/blog/what-is-the-difference-between-land-based-and-online-casinos].
"Understanding virtual reality and augmented reality," GCFGlobal, 2020, 5 pages [retrieved online Jun. 12, 2024 from: edu.gcfglobal.org/en/thenow/understanding-virtual-reality-and-augmented-reality/1/].
"Virtual reality," Wikipedia, last updated Feb. 22, 2024, 29 pages [retrieved online Feb. 28, 2024 from: en.wikipedia.org/wiki/Virtual_reality].
"Virtual Reality, the technology of the future," Iberdrola, 2020, 3 pages [retrieved online Feb. 28, 2024 from: www.iberdrola.com/innovation/virtual-reality].
"What is a Virtual Reality Casino and How Does It Work?" BetMGM, TheRoar, Dec. 4, 2023, 10 pages.
Dhaya "Improved Image Processing Techniques for User Immersion Problem Alleviation in Virtual Reality Environments," Journal of Innovative Image Processing (JIIP), 2020, vol. 02, No. 2, pp. 77-84.
Jacon "Image Generative AI: A Beginner's Guide," Medium, Jul. 24, 2023, 11 pages [retrieved online Jan. 8, 2024 from: medium.com/@taynarajacon/image-generative-ai-a-beginners-guide-8e3563b8e2ed].
O'Connor "How DALL-E 2 Actually Works," Assembly AI, Sep. 29, 2023, 32 pages [retrieved online May 22, 2024 from: www.assemblyai.com/blog/how-dall-e-2-actually-works/].
U/selayilly "What is generative AI and how does it work?" Reddit, Oct. 2023, r/generativeAI, 6 pages [retrieved online May 22, 2024 from: www.reddit.com/r/generativeAI/comments/176kisw/what_is_generative_ai_and_how_does_it_work/].

* cited by examiner

Ai Prompt Info

| | | |
|---|---|---|
| Win Prompts (1250) | "Provide me a win for a Egyptian slot machine with a win amount of XXX" | Happy |
| | "Provide me a exciting bonus win for a Egyptian slot machine with a win amount of XXX" | Bored |
| | "Provide me a large and exciting win to wake up a tired person" | Tired |
| Loss Prompts (1254) | "Provide me a loss for a Egyptian slot machine" | Happy |
| | "Provide me a near miss loss for a Egyptian slot machine. Make it exciting because the player is bored. " | Bored |
| | "Provide me an exciting loss for a Egyptian slot machine. Try to make fun of the player falling asleep" | Tired |

FIG.12B

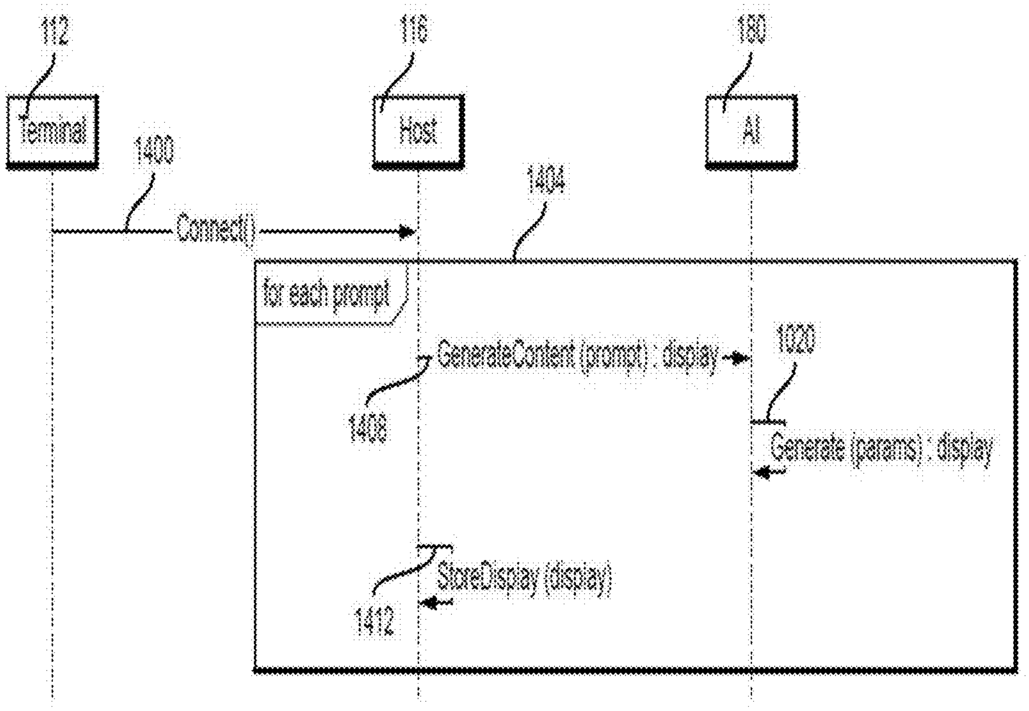

FIG.14

ARTIFICIAL INTELLIGENCE GENERATED CENTRAL DETERMINATION CONTENT

BACKGROUND

The present disclosure is generally directed towards gaming devices and systems and, more specifically, self-evolving, artificial intelligence (AI)-based content generative models.

Casino models have employed AI to analyze casino floor performance, propose to operators where and how many EGMs to place in their venue, and provide other casino floor performance recommendations.

BRIEF SUMMARY

In certain aspects, the present disclosure relates to a gaming system, device, and method supportive of self-evolving, AI-based content generative models.

In an aspect, a system includes a communication interface, a processor coupled with the communication interface, and a computer-readable storage medium coupled with the processor.

The computer readable storage medium stores a set of instructions thereon that enables the processor to:

- select a predetermined game outcome from a pool of predetermined game outcomes;
- in response to selection of the predetermined game outcome, generate a prompt to a generative model, the prompt comprising input related to the predetermined game outcome;
- receive content generated by the generative model based on the generated prompt;
- select at least a portion of the received content for presentation as part of a game display configured to provide the selected predetermined game outcome; and
- cause the received content to be presented by a gaming device as part of the game display In an aspect, a method includes the steps of:

- selecting, by a processor, a predetermined game outcome from a pool of predetermined game outcomes;
- in response to selecting the predetermined game outcome, generating, by the processor, a prompt to a generative model, the prompt comprising input related to the predetermined game outcome;
- receiving, by the processor, content generated by the generative model based on the generated prompt;
- selecting, by the processor, at least a portion of the received content for presentation as part of a game display configured to provide the selected predetermined game outcome; and
- causing, by the processor, the received content to be presented by a gaming device as part of the game display.

In an aspect, a gaming device includes a communication interface, a display, a user interface, a processor coupled with the communication interface, display, and user interface, and a computer-readable storage medium coupled with the processor.

The computer-readable storage medium stores instructions that enable the processor to:

- receive, by the communication interface, a predetermined game outcome selected from a pool of predetermined game outcomes;

- in response to receiving the predetermined game outcome, generate a prompt to a generative model, the prompt comprising input related to the predetermined game outcome;
- receive, by the communication interface, content generated by the generative model based on the generated prompt;
- select at least a portion of the received content for presentation as part of a game display configured to provide the predetermined game outcome; and
- present, by the display, the received content as part of the game display.

Additional features and advantages are described herein and will be apparent from the following Description and the figures.

BRIEF DESCRIPTION OF THE SEVERAL VIEWS OF THE DRAWINGS

FIG. 12B is a block diagram illustrating mood-based content prompts in accordance with aspects of the present disclosure;

FIG. 14 is a block diagram illustrating component interactions in content generation in accordance with aspects of the present disclosure;

DETAILED DESCRIPTION

Figure 1:
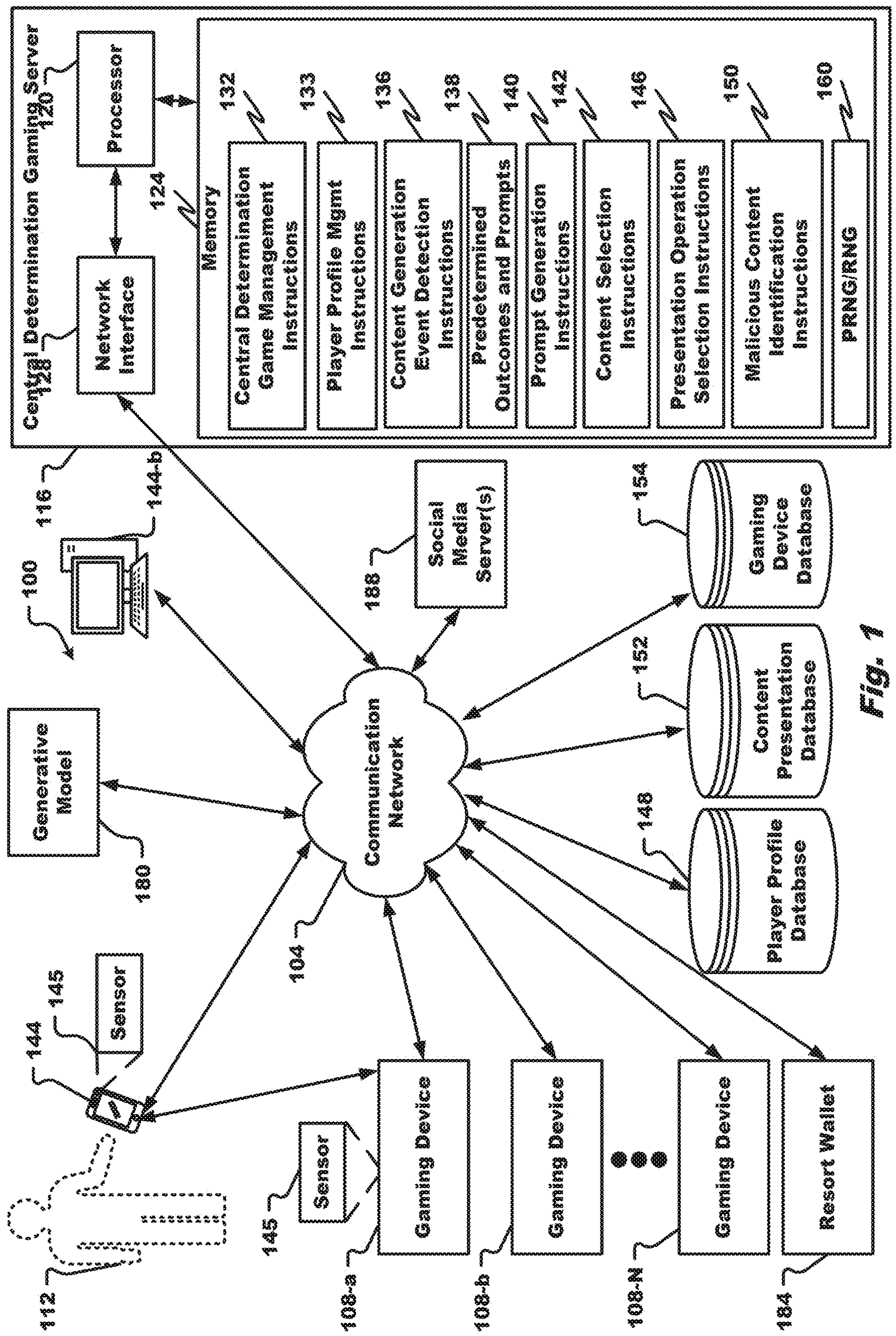
FIG. 1 is a block diagram of a gaming system in accordance with aspects of the present disclosure.

Aspects of the present disclosure will be described in connection with self-evolving, artificial intelligence (AI)-based models (also referred to as self-learning, AI-based content models such as generative models) in an environment such as, for example, a casino environment. While some examples in the present disclosure may reference the use of an Electronic Gaming Machine (EGM) as a gaming device via which players may participate in gaming activity, it should be appreciated that aspects of the present disclosure are not so limited. For example, any computing device, personal gaming device, or collection of computing devices or other gaming device such as a video lottery terminal (VLT), kiosk, web browser, mobile phone or virtual reality device may be used to facilitate invoking and implementing self-evolving AI-based content generation models.

Although a gaming server of the gaming system typically itself hosts or is in communication with a host of an AI-based content generation model, the gaming system can use a virtual EGM, game or application on the EGM, EGM game theme, or other component of the gaming system (i.e., gaming system component) to create the impression that content is generated by that component of the gaming system. As will be appreciated, a game theme can be any genre, storyline, or basis of a game or game type. Examples include a movie or TV program such as Lord of the Rings™, Stranger Things™, James Bond™, Willy Wonka™, and Game of Thrones™, a gameshow such as Wheel of Fortune™, The Price is Right™, Pyramid™, Let's Make a Deal™ or Jeopardy™, a historical event or person such as historical events including Romans, Egyptians, Cowboys and the Amazon and historical or living persons including Caesar, Cleopatra, John Wayne, and other genres, storylines, or game bases that are compatible with games and/or attractive to players.

The gaming system can use a rule-based or AI or machine learning (ML) model that generates new content to create the impression that one or more EGMs has a unique personality catered to the player. While the AI content generation model can be executed completely on an EGM, it is typically hosted on the gaming system or a server external to the gaming network. Using a gaming system or external server as a host can allow the content generation model to work across different gaming device manufacturers and even across product types.

In an exemplary embodiment, the gaming system is configured as a central determination gaming system that selects a predetermined game outcome from a pool of predetermined game outcomes; in response to selection of the predetermined game outcome, generates a prompt to a generative model, the prompt comprising input related to the predetermined game outcome; receives content generated by the generative model based on the generated prompt; selects at least a portion of the received content for presentation as part of a game display configured to provide the selected predetermined game outcome; and causes the received content to be presented to an eligible player by a gaming device as part of the game display.

The gaming system allows AI to generate content for Central Determination (CDS) games such as Class 2, Bingo and Historical Horse Racing (HHR) games. This is especially beneficial for CDS gaming because the display is often irrelevant. For example, in a Bingo system, the game player is playing is Bingo. A gaming server provides a win (or loss) amount to the EGM. The EGM then displays an "entertaining display" which happens to be a slot spin. In accordance with the present invention, AI could display anything entertaining and meet the Class 2 content regulations. The teachings of the present disclosure can provide new and changing content for CDS games, automatically saving time and money in the creation of new content. In accordance with the present disclosure, AI generated content could replace all or only selected portions of content rendered in a game.

The prompt typically comprises a content comprising a preference regarding one of a text, image, music, audio, color, style, animation, and video information. The preference can be associated by player profile(s) with a player, content preference(s) associated with a social website posting of the player, content preference(s) received from a mobile device of a player, a game theme associated with the plurality of gaming devices, a player activity detected by the gaming system, input received from the player, captured image(s) of the player, loyalty level(s) of the player, player demographics (e.g., player's residential address, age, socio-economic status, and the like), current player emotional or mood state, and loyalty point balance(s) of the player. In some embodiments, the selection of the content preferences to be used in the prompt can be based at least in part on player input.

The prompt can also include information such as the market, Class 2 gaming regulations of the jurisdiction of the gaming system, the name and information about the casino operator, and other information selected by the casino.

The prompt can also include a description of a location in the game display to render the received content. This is particularly beneficial for more complex displays where multiple items of content from different prompts are incorporated into a common display.

In some embodiments, the central determination gaming system, in generating the prompt, selects the prompt from a plurality of potential predetermined prompts. Each prompt can be associated with a different set of contextual parameters. An exemplary set of contextual parameters comprises a plurality of a number of consecutive wins, a number of consecutive losses, a player account status, a player loyalty status, a player gameplay history, an award amount, a game theme, an applicable law or regulation, a gaming system operator policy or restriction, and a player casino use history. The prompts can further include fields to be completed using one or more player preferences. The prompts can be selected randomly or pseudo randomly depending on the application.

As will be appreciated, a central determination gaming system can operate in a number of different manners. Generally, in a central determination gaming system, a gaming machine requests a previously determined game outcome (also referred to as a predetermined game outcome) from a central gaming server. The central server selects a game outcome from a finite pool of game outcomes in a pool file and communicates the game outcome to the gaming machine. The gaming machine then displays the game outcome to the player. For example, a player playing a slot gaming machine in a central determination gaming system may place a wager on a game. The slot gaming machine receives a game outcome for the game from the central server. Then, the gaming machine would display a combination of slot reel positions corresponding to the game outcome.

A gaming machine operating in a central determination gaming system first enrolls with an enrollment message in a central determination system pool with an associated pool file. The enrollment message includes bet information that may specify the game, the denomination, lines played, credits per line (or other analogous parameters in that game, such as cards or hands played), etc. Once enrolled in the central determination system pool, the gaming machine requests and receives game outcomes from the finite pool of game outcomes in the pool file.

After receiving an enrollment message that includes a wager, the central server can send a game outcome register to the gaming machine that includes a game identification and a predetermined outcome (e.g., a seed value, and/or a win amount). The seed value can be used to generate a game outcome of a single game.

In some embodiments of a central determination gaming system, a method of representing game outcomes uses seed values. A seed value is used to initialize a deterministic random number generator (RNG) so that the same seed value will produce the same sequence of random numbers every time. Those random numbers are known to produce a specific outcome in a game, such that a specific seed value is used to represent that specific outcome. For example, seed value X would always yield the same slot reel positions for a slot gaming machine.

Central determination gaming systems are typically configured to have a central server (host) that picks and provides outcomes to the gaming devices. The gaming devices then award the prize (or loss) and provides an entertaining display, such as a slot spin. For example, the host determines the player shall win 75 because of a Bingo win, but the gaming device shows a slot spin that lands on 3 cherries that wins 75. In most cases, the gaming device also displays the Bingo outcome, but this is commonly small and not the focus of the player.

Examples of central determination gaming systems include: Class 2, Bingo and Historical Horse Racing (HHR). In each case, a host has picked an outcome, and the gaming device displays some entertaining display that correlates to the outcome. For example, Class 2 Bingo games generally display a small bingo card somewhere but the primary display is a slot machine. In HHR by contrast, the host picks the player winnings and the game displays a horse race where the player wins the amount chosen by the Host.

In some embodiments, the gaming device causes the received content to be incorporated into content on a display portion separate from a display portion configured to render content of a gaming session, a sound emitted by the gaming device, an animation or avatar rendered by separate display portion, a shader rendered by the separate display portion, border, title, or frame rendered by the separate display portion, signage rendered by the separate display portion, and a message provided to a player by the gaming device. By way of illustration, the prompt could be used by a generative model to provide recommended content for presentation by the gaming device display, particularly the portions of the display displaying content designed for player entertainment, such as the slot machine portion of the display in Class 2 Bingo.

Like the content preference, the content can comprise one or more of a text, image, music, audio, color, style, animation, and video or movie information. The content can be HTML or similar content, which the gaming devices renders by a browser accessing the generated content previously stored in a library by the gaming system. The generated content can include a plurality of discrete content recommendations from which the gaming system selects the content for presentation by one or more gaming devices. The selection can be based on one or more parameters, including relatedness of the selected received content to a current game theme of the gaming device, relatedness of the selected content to the predetermined outcome, an outcome of using similar content for a presentation operation in a prior gaming session, a rule set of the gaming system setting forth desirable and undesirable content for the presentation operation, type of game, relatedness of the selected content to existing content of other presentation operations of the gaming device that are to be used concurrently with the selected received content, and the like.

The game display can include predetermined content in addition to the received content. This requires the gaming system to stitch the predetermined or preexisting content together with the received content to create a cohesive and coordinated display of information. The use in the prompt of the predetermined content as contextual information can assist in creating such a cohesive and coordinated display.

The foreknowledge of the outcome can enable the central determination gaming system to generate a prompt including not only contextual information (e.g., a content preference associated by a player profile with a player, a content preference associated with a social website posting of the player, a content preference received from a mobile device of the player, or other player content preference (e.g., player like or dislike), a game theme associated with the gaming device, a player activity detected by the gaming system, input received from the player, a captured image of the player, a loyalty level of the player, and a loyalty point balance of the player, a game type and theme, game device and/or gaming system state, and the like) but also predetermined outcome information (e.g., win or loss and amount or payout). The combination of contextual information and predetermined outcome can increase player trust in the gaming system and increase levels of player enjoyment in the game.

The foreknowledge of the outcome can further enable content to be generated that is different from more traditional Class 2 content, such as a slot game appearance. For example, the content can be highly customized to the player's likes and dislikes with respect to game themes and game components. For example, the symbols in the reel of the current slot game can be replaced by dice for players that enjoy dice games more than slot games.

Player eligibility can be determined in a number of ways. In some embodiments, the player must be authenticated successfully by the gaming system for the content preferences of the player to be considered in prompt generation. Authentication can be done by any suitable authentication techniques, such as single use passwords or passcodes, digital certificate, image recognition based on gaming system camera still or video images, and other knowledge-based, physiological biometrics-based, behavioral biometrics-based, and two/multi-factor authentication techniques. In some embodiments, the player is identified and authenticated by inserting a player tracking card into the EGM or other gaming device in secure communication with a player tracking system. As will be appreciated, other methods are also possible, such as the player tapping their mobile device to a wireless radio of the EGM, scanning a QR code displayed on or adjacent to the EGM, etc. In some embodiments, the player is not able to participate in a gaming session using generated content and/or content preferences in prompt generation without the player's prior consent.

In response to detection of a content generation event or other trigger, the central determination game system generates a prompt to the generative model and provides a content generation request comprising the prompt to the generative model. The detected content generation (or trigger) event can include one or more of: successful authentication of a player of the group of players by the gaming system, detection of a location of a mobile device associated with a player of the group of players, detection of at least a threshold level of gameplay by a player of the group of players, occurrence of a predetermined state of the gaming system, occurrence of a predetermined player loyalty activity by the gaming system, detection that gameplay on another gaming device currently presenting different selected content is below a threshold level of gameplay, detection that a presentation duration of the different selected content is at least a threshold duration, detection of a new content preference associated with a player of the group of players occurrence of a predetermined random or pseudorandom number, occurrence of at least a threshold loyalty point balance or loyalty status associated with a player of the group of players, occurrence of a predetermined clock value, entrance of a player or player(s) of the group players into a defined area of the gaming system, occupancy of at least a threshold number of players of the group players in the defined area of the gaming system, and departure of a player or player(s) of the group players from the defined area of the gaming system.

In some embodiments, the content generation (or trigger) event is based or contingent upon a number of factors including a state of the gaming system, a state of a gaming session with the player, and/or current and/or historic player behavior data. The state of the gaming session can be based on observed real-time gameplay data of the player during a concurrent gaming session (considering factors such as game outcome, game theme, speed of play, cash in amount, cash out amount, play session length, additional in-session cash in amounts, wager behavior (e.g., change of wager behavior, average wager amount, Min/Max wager amount, wager to win correlation, number of lines played, denomination selected, side bet features activated/deactivated, and playing double-up or similar features and other metrics of wager behavior), wagering speed, idle time, etc. The state of the gaming system can be based on the collective gameplay and configuration data for multiple gaming sessions, including the gameplay and configuration data associated only with the particular gaming session.

In some embodiments, the content generation (or trigger) event for a particular session state is based on one or more of a credit amount at the start of a gameplay session (e.g., 'SumCashInAmount'), a credit amount at the end of a prior gameplay session (e.g., 'SumCashOutAmount'), quantity of wager adjustments during a temporal period and/or during a gameplay session (e.g., 'No. of bet changes'), a ratio of a wager amount to a player bankroll (e.g., 'Wager-Bank-Ratio'), gameplay duration associated with gameplay session (e.g., 'TimePlayed'), average wager amount for a primary game (base game) (e.g., 'AverageWagerPrimary'), an average win amount associated with a primary game (e.g., 'AveragePrimaryWinAmount'), quantity of primary games played during a temporal period and/or during a gameplay session (e.g., 'No.PrimaryGamesPlayed'), quantity of secondary games (bonus games) played during a temporal period and/or during a gameplay session (e.g., 'No.SecondaryGamesPlayed), and the like.

In some aspects, the gameplay data may be data (e.g., gameplay data, sensor data, etc.) collected directly via a gaming device associated with a player and a gameplay session. The data may be collected via a central game management system, a player tracking system, a casino management system, a controller/data aggregator (e.g., iLink-type device), or the like. The tracked inputs may include active inputs (e.g., a gameplay decision, a button press, a handle pull, etc.) and/or passive inputs (e.g., a measured biometric parameter) In some examples, the gaming device may track and forward gameplay results (e.g., resulting game outcomes).

The content can be generated in substantial real time or in advance and cached in a content library. To conserve processing resources and decrease processing latency associated with gaming, the gaming system can map a content preference associated with the content generation event against previously generated prompts and associated gameplay performance levels and associated generated content to determine whether to provide a prior prompt to the generative model in lieu of generating new content by the generative model. In other words, a set of content preferences for one or more players may have been used in a prior selection operation, and the gaming system, using historical information, can use the same rationale employed previously and quickly generate a prompt. In some embodiments, the analysis considers the historical outcome from using the prior prompt and selects the prior prompt when the outcome was desirable. When the outcome was undesirable, the gaming system selects a different set of preferences associated with the player for the prompt or a different prompt having a determined level of relatedness to the selected preferences but having a different and more desirable outcome. The mapping can be done efficiently by mapping a prompt ID against a content ID. The ID can be a hash, pixel comparison, or other summary or description of the corresponding prompt or content, respectively, to decrease mapping latency.

To make mapping possible, the gaming system records the generated prompt, an identifier of the received content, a timestamp associated with presentation of the content, an identifier of the gaming session, and a player behavior indicator indicating a response of a player to presentation of the content as part of the game display. As noted, the player behavior indicator describes the outcome from presenting the content, which typically indicates a response of the player to content presentation.

The library of previously generated content against which the prompt is mapped can be periodically refreshed by replacing the received content in the library with new received content from the generative model based on the corresponding prompt. The timestamp associated with generation of the content can be used as an indicator of the age of the associated content, and, after the content has a certain age, the content can be regenerated by the generative model using the same prompt and the regenerated content and new timestamp can replace the aged-out content and old timestamp in association with the prompt.

The gaming system can improve content and presentation operation selection outcomes by tracking historical behaviors. In one embodiment, the gaming system associates a game or session identifier associated with a game played by the player on the gaming device while the received content is presented by the gaming device to the player and gameplay information associated with the played game with a content identifier and presentation operation identifier associated with the at least a portion of the selected content. The association can include an outcome description or player behavior indicator indicating whether or not the content and associated content modified presentation operation produced a desirable or undesirable outcome for the gaming system and players. The outcome for instance can indicate a level of gameplay of and/or wagering one or more players while the content is rendered, a level of popularity of the game as modified by the content, a level of occupancy of gaming devices providing the game modified by the content, other gameplay or loyalty information, and the like.

In some embodiments, the outcome or player behavior indicator is based on a number of factors, including for example player input on the appropriateness of the generated content, an actual behavior of the player identified as being in response to the generated content and presentation operation pairing, and a difference between a target player behavior associated with the generated content and the actual behavior of the player in response thereto. The target behavior can be selected based on a variety of criteria, including the physical location, type, and state of a gaming device in the gaming system. The target and actual behaviors can relate, for example, to an action of the player performed within a defined time interval of the gaming system rendering generated content to a player.

The generative model can be any type of content generative model and typically includes a prompt encoder trained to map the prompt to a representation space and an image decoder that stochastically generates an image representing the representation space. Common generative models include one of a variational autoencoder (VAE), generative adversarial network (GAN), autoregressive model, diffusion model, and transformer-based model. Neural networks used in generative models include recurrent neural networks (NNs) and convoluted neural networks (CNNs). Examples of generative models include DALL-ETM and MIDJOURNEY™.

To avoid repetitive use of the same content, a variability hyperparameter of the model, such as temperature, may be employed. As will be appreciated, temperature is a hyperparameter used during the generation phase of models, especially those based on probabilistic frameworks like neural networks. When a generative model tries to predict the next token (or piece of information), it computes a probability distribution over possible tokens. Each token gets a likelihood score of being the next output. Temperature is used to sample a token from this distribution. A high temperature means that the probability distribution becomes flatter, making less likely tokens more probable. This results in more randomness and diversity in the output. A lower temperature means that the distribution becomes sharper, with the model becoming more deterministic and likely to pick the most probable token. Temperature therefore strikes a balance between the desired level of creativity and the acceptable level of coherence.

The generated image can be presented by the gaming device before or during a gaming session with the player. The gaming system can select a presentation operation from among plural presentation operations to be modified by the received content. The selection can be based on one or more parameters, including relatedness of the selected received content to a current game theme of the gaming device, relatedness of the selected received content to the predetermined content, an outcome of using similar content for a selected presentation operation in a prior gaming session, a rule set of the gaming system setting forth desirable and undesirable content, type of game, relatedness of the selected content to existing content of other presentation operations of the gaming device that are to be used concurrently with the selected received content, and the like. Exemplary presentation operations include rendering one or more of a slot symbol used in the game played on the gaming device, background image displayed by displays of the plurality of gaming devices, payline used in the game played on the plurality of gaming devices, button panels of the plurality of gaming devices, sound emitted by the plurality of gaming devices, animation rendered by the displays, card back or face used in a game played on the plurality of gaming devices, icon rendered by the displays, avatar rendered by the displays, character rendered by the displays, shader rendered by the displays, border, title, or frame rendered by the displays, signage rendered by the displays, and a message provided to the players in the group of players by the plurality of gaming devices.

The prompt generation and generated content and presentation operation selection operations can be performed by an AI model, such as a machine learning model or data set that is useable in a neural network and that has been trained by one or more data sets that describe selected preferences in prompts and resulting generated content and selected generated content and/or presentation operations and associated outcome, respectively. The model(s) may be stored as a model data file or any other data structure that is usable within a neural network or an AI system. In addition to a data set that describes selected preferences in prompts and/or resulting generated content and selected generated content and presentation operations and associated outcome, the model may be trained using gameplay data, player information, and other gaming system state information, such as slot machine configurations and operations, payment methods, money transfer methods, game mechanics, and other gameplay and gaming system information.

In one embodiment, the gaming system has a single AI-enabled model for all types of gaming devices, games, and/or players while in other embodiments a unique model is maintained for each gaming device type, game type, or player group. One or more models can be concurrently assigned to one or more gaming sessions. The model(s) can receive gameplay data of multiple gaming sessions of multiple different players on different gaming devices and/or configuration data associated with each of the gaming devices.

The AI-enabled models can make a real-time determination of which generated content and which presentation operation pairing has the highest likelihood of producing a desired or target player behavior by using not only general information relating to the gaming system state but also real-time and historic gameplay data of one or more players, including the player in question. AI can observe and compare in real time one or more players' behaviors and the respective revenues realized by the players as a function of time—which cannot be done mentally.

To avoid using potentially sensitive information of a player as a player content preference in prompt generation, the gaming system can require prior player approval before a player content preference is used in a prompt. In addition, the gaming system can be restricted from using sensitive information of the player by including sensitivity tags or other metadata in sensitive fields of the player's profile.

The prompt generation, content generation, and content and presentation operation selection models can be fully executed by an AI system without the involvement of casino or gaming staff to assist in message formulation. The AI system(s) can enable the gaming system to use auto-generated content not only in various presentation operations to produce desired or target behaviors but also to modify gaming device functions, operations, and configurations at the request of a player.

The various model(s) can induce an illusion of gaming system familiarity and awareness of the player's needs, desires, and activities, which can enhance player trust in the gaming system and player satisfaction, increase player engagement, and enable gaming systems operators to have higher levels of floor (e.g., casino gaming device) utilization by selecting EGMs in less occupied areas of the floor for modification by rendering selected generated content. The gaming system can increase player engagement and trust of the gaming system by allowing a player to engage with a gaming device providing content customized to the player's preferences. By way of illustration, the player feels that he/she is communicating directly with a customized and personalized gaming system component even though the gaming device is actually receiving content from a server hosting the generative model.

In gaming systems, security is a paramount concern. Introduction of new technologies in a gaming system can render new vulnerabilities for malware and other malicious content. To maintain gaming system security, the gaming system can employ multiple levels of security monitoring. For example, the prompt provided to the generative model can be parsed to identify malicious content, particularly when the prompt comprises user inputted preferences. The gaming system can further parse generated content received from the generative model to identify malicious content.

Malicious content in player content preferences, the prompt itself, or received auto-generated content can take many forms, including one or more of a quick response ("QR") code, malware, a malformed image file, and content violating a game rule. An example of the former is a QR code incorporated in a player provided image that directs a different player to a website represented by the QR code. The website can be used to collect sensitive player information that may be employed for identity theft, unlawful access to a gaming system account of the player, an advertising page of a competitor, a page providing negative advertising regarding the gaming system, and the like. Examples of malware include viruses, worms, Trojan viruses, spyware, adware, and ransomware. An example of a malformed image file is an image file that violates a set of gaming device image display rules, such as an incorrect image size, style, pixel dimension, pixel resolution, format, or other parameter of an image, a wrong number of layers, or an inconsistent color set, etc. An example of content violating a game rule is content that itself violates a game rule creating player confusion or induces player behavior that violates a game rule. By way of illustration, the prompt could include a player preference regarding a description of an image that resembles an image of a wild symbol, scatter symbol, and/or multiplier symbol that causes the generative model to generate content that is confusingly similar to the symbol type, thereby causing player confusion.

In some gaming environments (e.g., casino environments), an EGM may include a conventional intelligent agent (e.g., a gameplay assistant, a gameplay model, a player companion, etc.) which, when activated during a gameplay session at the EGM, may assist the player and/or server as a personalization enabler. However, in some other implementations of conventional intelligent agents, the player behaviors are hard-coded and created with either common player traits (e.g., generic behaviors, personalities, etc.) and/or are based upon a relatively limited number of parameters. A technical problem of such conventional intelligent agents is their inability to behave "intelligently" (e.g., in more complex gameplay situations) in supporting user-tailored experiences. For example, in some systems, such intelligent agents are not fed with additional data (e.g., feedback, gameplay data, etc.) and are unable to evolve beyond a base model. In some cases, the conventional intelligent agents are incapable of drawing on self-learning implications.

A further technical problem of conventional intelligent agents is how to create, update, maintain and use output from gaming system operations in self-evolving AI-based models to enhance performance of a gaming system. Data processing to maintain these models, in real-time across many players at one-second intervals, is computationally challenging and intensive. How to incorporate such models into existing gaming systems to enhance gaming system operation and player enjoyment without undue computational costs and processing latency creates yet another technical problem.

A technical solution provided by some embodiments of the present disclosure inputs player content preferences and optionally gaming system operational information into one or more AI prompt generation, content generation, and content and/or presentation operation selection models in a casino environment (e.g., associated with EGMs) in which the various models are capable of self-evolving (also referred to herein as self-learning) based on associated outcomes (e.g., gameplay events, gameplay operations, gameplay decisions (such as gameplay choices, slot pulls, bonus selections, etc.), gameplay outcomes and behaviors (or gameplay data such as average speed of play, average cash in amount, average cash out amount, average play session length, average additional in-session cash in amounts, average wager behavior, average wagering speed, and average idle time for historical gameplay sessions), and other player related or gaming system-related parameters (e.g., behavioral shifts in gameplay decisions, biometric data, wager behavior, etc.)) to provide more appropriate player customized content for presentation operations. For example, a gaming system may support initial training and creation of a baseline generative model, in which the baseline generative model is associated with a corresponding object (e.g., individual player, representative player, gaming system, gaming device, or presentation operation). The gaming system may continuously feed the content and/or presentation operation selection model with historic or real time player content preferences and resulting prompts. The gaming system may continuously feed the generative model with historic or real time prompts and associated selected received generated content. The gaming system may continuously feed the prompt generation model with historic or real time selected content and presentation operation pairings and associated outcomes (e.g., gameplay decisions, behavioral shifts, button inputs, etc.)) generated by the player or EGM or other gaming system component(s) in association with a gameplay session. In some aspects, via AI mechanisms, each model may self-evolve to enhance itself to optimize the messaging interaction between the gaming system and the player. In addition to the models' abilities to use real-time gameplay data to maintain/update/improve model capabilities, the models can provide output to the operator that can be used internally (for in-depth analysis purposes). Aspects of the present disclosure describe example techniques associated with generating such models, example methods of implementing the models in a gameplay environment (e.g., casino environment), examples of modifying the models, and example use-cases thereof.

In an example, the models described herein may support learning or evolving based on multiple different input sources (e.g., player data, player-related parameters (e.g., speed of play, cash in amount, cash out amount, play session length, additional in-session cash in amounts, wager behavior, wagering speed, and idle time), etc.) to increase the complexity and range of functionality of the models. Accordingly, for example, the prompt generation, generative, and content and presentation operation selection models can collectively generate prompts and associated content and select content and presentation operations, from a plurality of prompts, generated content, and content and presentation operation pairing selections, to induce a player to behave in a targeted manner or produce a target behavior. The accuracy of the prediction can be used to update or modify the models to yield more accurate predictive performance in future player interactions.

Aspects of the present disclosure may provide explicit improvements through AI. For example, systems described herein may support more accurate recommendations (e.g., content and presentation operation selection recommendations by the various models) and/or predictions of behaviors (e.g., target player behaviors) based on a large number of historical player behavior data. In some aspects, multiple thousands (e.g., millions) of historical events may be incorporated into the model(s) described herein. Aspects of the present disclosure support modifying (e.g., changing, adjusting) the model(s) over time, based on single events (e.g., per each instance of a gameplay event such as granular gameplay data), groups of events (e.g., per multiple instances of gameplay events such as summarized gameplay data). Example techniques described herein may provide reduced processing overhead (e.g., computing power, calculation time, etc.) compared to other techniques that analyze all single entries of historical data and compare the entries against new data, instead of using an AI model.

Aspects of the present disclosure may support output-learnings. For example, the gaming server (e.g., using a machine learning network and a model, etc.) may compare an action or event (e.g., a new content preference, prompt, received generated content, content and presentation operation selection, etc.) to previous actions and/or events (e.g., a prior content preference, prompt, received generated content, selected generated content and/or presentation operation or outcome) (also referred to herein as historical actions and/or historical events). In an example, the gaming server may determine that there is a match between the action or event and a previous action or event. For example, the gaming server may determine that the action or event is the same as a previous action or event (or similar to the previous action or event with respect to a deviation threshold) under similar gameplay conditions. This comparison could be rigid, or another factor could be introduced in order to induce some randomness into the behavior.

With reference initially to FIG. 1, details of an illustrative central determination gaming system 100 will be described in accordance with at least some embodiments of the present disclosure. The components of the central determination gaming system 100, while depicted as having particular instructions and devices, are not necessarily limited to the examples depicted herein. Rather, a gaming system according to embodiments of the present disclosure may include one, some, or all of the components depicted in the central determination gaming system 100 and does not necessarily have to include all of the components in a single device. For example, the components of a server may be distributed amongst a plurality of servers and/or other devices (e.g., a gaming device, a portable user device, etc.) in the gaming system 100 without departing from the scope of the present disclosure.

The central determination gaming system 100 may include a communication network 104 that interconnects and facilitates machine-to-machine communications between one or multiple gaming devices 108 (e.g., any of gaming device 108-*a* through 108-N) and a gaming server 116. It should be appreciated that the communication network 104 may correspond to one or many communication networks without departing from the scope of the present disclosure. In some embodiments, gaming device 108-*a* through gaming device 108-N and gaming server(s) 116 may be configured to communicate using various nodes or components of the communication network 104. The communication network 104 may include any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may include a number of different communication media such as coaxial cable, copper cable/wire, fiber-optic cable, antennas for transmitting/receiving wireless messages, and combinations thereof.

A generative model 180 can be in communication with the gaming system 100 via the communication network 104. The generative model 180 can be any content generation model that converts a prompt into one or more content sets. Common generative models include one of a variational autoencoder (VAE), generative adversarial network (GAN), autoregressive model, diffusion model, and transformer-based model. In some embodiments, the generative model is on the internet while in other embodiments the generative model is on a closed local network accessible only to the gaming system or multiple gaming systems.

In some embodiments, the encoder and decoder are configured as variational autoencoders (VAEs). In VAEs, the encoder extracts from the prompt input sequence all features in the sequence, converts them into vectors (e.g., vectors representing the semantics and position of a word in a sentence), and then passes them to the decoder. The decoder works on the target output sequence. Each decoder receives the encoder layer outputs, derives context from the outputs, and generates the output sequence. Both the encoder and the decoder in the transformer include multiple encoder blocks piled on top of one another. The output of one block becomes the input of another.

In some embodiments, the generative model is configured as a generative adversarial network or GAN. The GAN is a machine learning algorithm that employs, in an adversarial relationship, two neural networks, namely a generator and discriminator. The generator is a neural net that creates fake input or fake samples from a random input vector (a list of mathematical variables each of whose value is unknown) and the discriminator is a neural net that takes a given sample from the generator and decides whether or not it is a fake sample from a generator or a real sample from the domain. In some embodiments, the discriminator is a binary classifier that returns a probability of whether or not the sample is a fake. The generator and discriminator can be implemented as CNNs (Convolutional Neural Networks).

The generative model can perform many different types of transformations or translations of the prompt to content, including without limitation a style transfer of a prompt image to a generated image, sketch in the prompt to a realistic image, prompt text to an image, prompt text to speech or other audio output, prompt text to video, prompt text to lighting sequences, and a prompt image or video to a higher or lower resolution image or video.

When the prompt comprises text, a text-to-image models may be employed that generally combines a (natural) language model for transforming the input text into a latent representation, and the generative image model, which produces an image conditioned on that representation.

A resort wallet 184 (and associated casino wallet, retail wallet, sports/mobile wallet, and patron manager (not shown)) can be in communication with the gaming system 100 via the communication network 104. The patron manager manages the award of loyalty points and balance of players' loyalty points accounts. Typically, the patron manager monitors gaming events of players on gaming devices 108 and changes in the balance of the resort wallet 184 (including casino wallet, retail wallet, and sports/mobile wallet, and other player transactions with the gaming establishing or casino and, applying promotional rules, increments or decrements a player's loyalty point balance in the resort wallet 184.

Social media server(s) 188 of a social networking service can be in communication with the gaming system 100 via the communication network 104. The social networking service or SNS (or social networking site) can be any online social media platform used by members to build social networks or relationships with other members who share similar personal or career content, interests, activities, backgrounds or real-life connections. Social networking sites allow users to share ideas, digital photos and videos, posts, and to inform others about online or real-world activities and events with people within their social network. Examples include Facebook™, Instagram™, X™ or Twitter™, and the like.

In some embodiments, the gaming devices 108 (e.g., gaming device 108-*a* through gaming device 108-N) may be distributed throughout a single property or premises (e.g., a single casino floor), or the gaming devices 108 (e.g., gaming device 108-*a* through gaming device 108-N) may be distributed among a plurality of different properties. In a situation where the gaming devices 108 are distributed in a single property or premises, the communication network 104 may include at least some wired connections between network nodes. As a non-limiting example, the nodes of the communication network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 108 (e.g., gaming device 108-*a* through gaming device 108-N) may utilize the same or different types of communication protocols to connect with the communication network 104. It should also be appreciated that the gaming devices 108 (e.g., gaming device 108-*a* through gaming device 108-N) may present the same type of game or different types of games to a player 112. For example, the gaming device 108-*a* may correspond to a gaming machine that presents a slot game to the player 112, the gaming device 108-*b* may correspond to a video poker machine, and other gaming devices 108 may present other types of games (e.g., keno, sports wagering, etc.) or a plurality of different games for selection and eventual play by the player 112.

In some aspects, some of the gaming devices 108 (e.g., gaming device 108-*a* through gaming device 108-N) may communicate or exchange data with one another via the communication network 104. In some embodiments, one or more of the gaming devices 108 may be configured to communicate directly with a centralized management server and/or the gaming server 116. Although not depicted, the gaming system 100 may include a separate server or collection of servers that are responsible for managing the operation of the various gaming devices 108 in the gaming system 100.

It should also be appreciated that the gaming server 116 may or may not be co-located with one or more gaming devices in the same property or premises. Thus, one or more gaming devices may communicate with the gaming server 116 over a WAN, such as the Internet. In such an event, a tunneling protocol or Virtual Private Network (VPN) may be established over a portion of the communication network 104 to ensure that communications between an EGM and the server 116 (e.g., a remotely-located server) are secured.

The gaming devices 108 (e.g., gaming device 108-*a* through gaming device 108-N) may correspond to a type of device that supports interaction by a player 112 in connection with playing games of chance. Examples of a gaming device 108 may include any type of known gaming device capable to Class 2 gaming, such as an EGM. In addition to playing games on a gaming device 108, the player 112 may also be allowed to interact with and play games of chance on a communication device 144*a, b*.

The central determination gaming system 100 may support interaction with one or more communication devices 144. A communication device 144 (e.g., communication device 144-*a*) may be a mobile device of a player 112 (e.g., a personal communication device such as a smart phone, a tablet, a smart watch, etc.) or to a device issued by a casino to the player 112. It should be appreciated that the player 112 may play games directly on the communication device 144. Alternatively, or additionally, the communication device 144 may establish a communications (e.g., over a wireless or wired connection) with a gaming device 108 such that the communication device 144 provides an interface for the player 112 to interact with the gaming device 108. As shown in FIG. 1, the communication device 144 may be in communication with the communication network 104 or in direct communication (e.g., via Bluetooth, WiFi, etc.) with a gaming device 108. Non-limiting examples of a communication device 144 include a cellular phone, a smart phone, a tablet, a wearable device, an augmented reality headset, a virtual reality headset, a laptop, a Personal Computer (PC), or the like. In some cases, another communication device 144 (e.g., communication device 144-*b*) may be a mobile device, a PC, or the like of a casino operator (e.g., a floor attendant, a casino manager, etc.).

In some cases, the central determination gaming system 100 may support "carding in" of a player at a gaming device 108 with a physical card (e.g., a player club card). In other cases, the central determination gaming system 100 may support "carding in" of a player at a gaming device 108 via a mobile application on a communication device 144. In some aspects, the mobile application may support fund transfers between a player account and the gaming device 108 (e.g., a server, the casino). For example, using the mobile application, the player may transfer funds to a gameplay session.

In an example of "carding in," the communication device 144 may exchange information with the gaming device 108 over a wireless connection (e.g., near field communication (NFC), Bluetooth, etc.) when the communication device 144 is within a threshold distance of the gaming device 108. In another aspect, the communication device 144 may "card in" and exchange information with the gaming device 108 when the communication device 144 is connected to the gaming device 108 using a physical communications link (e.g., a communications cable). In an example, when "carding in," the communication device 144 may provide player identification information (e.g., player identity, player club status, player preference information, etc.) to the gaming device, the server, and/or the gaming system. The gaming server 116 (or the gaming device 108) may establish a gameplay session at the gaming device 108 for the player based on the information provided during the "card in."

In an embodiment, the gaming system only enables autogenerated content modification of presentation operations in gaming sessions with a player after he or she successfully cards in to the gaming system. Stated differently, no autogenerated content is presented to the player before he or she successfully cards in or after he or she cards out.

The gaming server 116 may support example aspects described herein of acquiring sensor data associated with a gameplay session using any combination of sensors 145 (e.g., sensor 145-*a*, sensor 145-*b*, etc.) (also referred to herein as sensor devices). The sensors 145 may be implemented at (e.g., integrated in) any combination of gaming devices 108 and/or communication devices 144. In some aspects, the sensors 145 may be standalone devices capable of communicating with any component (e.g., a gaming device 108, a gaming system 100, a database, etc.) of the gaming system 100, for example, via the communication network 104. In some aspects, the sensors 145 may provide the sensor data to a machine learning engine 141, aspects of which are described later herein.

In some aspects, the sensors 145 may include any combination of: an image sensor, an eye tracking sensor, a heart rate sensor, an infrared sensor, an audio sensor (e.g., a microphone), a pulse sensor, an oxygen sensor, a temperature sensor, a pressure sensor (e.g., integrated within a button, a keypad, etc.), a touch screen sensor, a vibration sensor, a motion sensor, an accelerometer, or the like. In some cases, the sensors 145 may be integrated within a physical interface of a gaming device 108 or a communication device 144. In some cases, the sensors 145 may be integrated at or within a threshold distance of a gaming device 108. For example, the sensors 145 may be integrated with a seat cushion, an arm rest, a seat back, a pull handle, a "spin" button, etc.

In some examples, the sensors 145 may capture or measure, as part of gameplay data, biometric data (e.g., facial features, facial response, eye movement, pupil dilation, heart rate, temperature, pulse, speech or speech patterns, breathing pattern, etc.) of a player with respect to a decision event, a gameplay decision, and/or a gameplay result in association with a gameplay session. The sensors 145 may detect changes and/or patterns in biometric data in association with a decision event, a gameplay decision, and/or a gameplay result in association with a gameplay session. In some aspects, the sensors 145 may include smart sensors capable of scanning and/or measuring a player's biometric parameters such as pulse, breathing rate, heart rate, eye focus, body movement, attention, electroencephalogram (EEG) parameters (e.g., electrical activity of the brain), electrocardiogram (ECG or EKG) parameters (e.g., heard rhythm and electrical activity), voice, speech pattern, etc.

In some other examples, the sensors 145 may capture or measure, as part of gameplay data, a value (e.g., force, velocity, etc.) corresponding to physical inputs (e.g., button presses, etc.) by the player at a gaming device 108 in association with a decision event, a gameplay decision, and/or a gameplay result in association with a gameplay session. For example, a sensor 145 (e.g., sensor 145-*a*) at a gaming device 108 (e.g., gaming device 108-*a*) may be a pressure sensor integrated within a button (e.g., a "spin" button, a "bet" button, etc.) at the gaming device 108, and the sensor 145 may capture or measure a value indicating a force at which the player presses the button.

In some other examples, the sensors 145 enable player tracking using a location-based tracking service in which an application or other software in the sensor uses global positioning service (GPS), radio frequency identifier (RFID), Wi-Fi or cellular data to trigger a pre-programmed action when a communication device 144 or RFID tag carried by the player enters or exits a virtual boundary set up around a geographical location.

The sensor data (e.g., biometric data, value corresponding to a physical input, etc.) may be used as part of the gameplay data to determine an outcome associated with a prompt, autogenerated content, or pairing of selected generated content and presentation operation or to predict player real-time location in the casino or gaming system.

The central determination gaming server 116 is further shown to include a processor 120, a memory 124, and a network interface 128. These resources may enable functionality of the gaming server 116 as will be described herein. For example, the network interface 128 provides the server 116 with the ability to send and receive communication packets or the like over the communication network 104. The network interface 128 may be provided as a network interface card (NIC), a network port, drivers for the same, and the like. Communications between the components of the server 116 and other devices connected to the communication network 104 may all flow through the network interface 128.

The processor 120 may correspond to one or many computer processing devices. For example, the processor 120 may be provided as silicon, as a Field Programmable Gate Array (FPGA), an Application-Specific Integrated Circuit (ASIC), any other type of Integrated Circuit (IC) chip, a collection of IC chips, a microcontroller, a collection of microcontrollers, or the like. As a more specific example, the processor 120 may be provided as a microprocessor, Central Processing Unit (CPU), or plurality of microprocessors that are configured to execute the instructions sets stored in memory 124. Upon executing the instructions stored in memory 124, the processor 120 enables various authentication functions of the gaming server 116.

The memory 124 may include any type of computer memory device or collection of computer memory devices. The memory 124 may be volatile or non-volatile in nature and, in some embodiments, may include a plurality of different memory devices. Non-limiting examples of memory 124 include Random Access Memory (RAM), Read Only Memory (ROM), flash memory, Electronically-Erasable Programmable ROM (EEPROM), Dynamic RAM (DRAM), etc. The memory 124 may be configured to store the instructions depicted in addition to temporarily storing data for the processor 120 to execute various types of routines or functions. Although not depicted, the memory 124 may include instructions that enable the processor 120 to store data to and retrieve data from a player profile database 148, a content presentation database 152, and/or a gaming device database 154.

Alternatively or additionally, the player profile database 148 or data stored thereon may be stored internal to the any of the communication device 144, a gaming device 108, and/or the server 116 (e.g., within the memory 124 of the server 116 rather than in a separate database). Alternatively or additionally, the content presentation database 152 or data stored therein may be stored internal to the server 116. Alternatively or additionally, the gaming device database 154 or data stored thereon may be stored internal to the server 116.

The databases described herein (e.g., player profile database 148, content presentation database 152, and gaming device database 154) may include a relational database, a centralized database, a distributed database, an operational database, a hierarchical database, a network database, an object-oriented database, a graph database, a NoSQL (non-relational) database, etc. In some aspects, the databases may store and provide access to, for example, any of the stored data described herein.

In some aspects, the gaming system 100 may be implemented using a fully software-based solution. In some other aspects, the gaming system 100 may be implemented using a combination of software and hardware accelerators for offloading AI processing tasks and/or AI data handled at the gaming system 100. Aspects of the present disclosure and solutions thereof may be used locally at an EGM (e.g., a gaming device 108), a local server (e.g., gaming server 116 or a different server), and/or on a cloud server (e.g., gaming server 116 or a different server). Example processors (also referred to herein as co-processors) usable for offloading the AI processing tasks and/or AI data may include any combination of GPUs, ASICs, FPGAs, or the like. In some aspects, the processors (e.g., co-processors) may be located at a gaming device 108 and/or the gaming server 116. In some other aspects, processors (e.g., co-processors) located at a communication device 144 (e.g., a cellular phone, a smart phone, a tablet, a wearable device, an augmented reality headset, a virtual reality headset, etc.) may be used for offloading the AI processing tasks and/or AI data.

The illustrative instructions that may be stored in memory 124 include, without limitation, a central determination game management instructions 132, player profile management instructions 133, content generation event detection instructions 136, predetermined outcomes and prompts 138, prompt generation instructions 140 (which may be a self-evolving AI model), content selection instructions 142 (which may be a self-evolving AI model), presentation operation instructions 146 (which may be a self-evolving AI model), and malicious content identifications 150. Functions of the server 116 enabled by these various instructions will be described in further detail herein. It should be appreciated that the instructions depicted in FIG. 1 may be combined (partially or completely) with other instructions or may be further separated into additional and different instructions, depending upon configuration preferences for the server 116. Said another way, the particular instructions depicted in FIG. 1 should not be construed as limiting embodiments described herein.

The central determination game management instructions 132, when executed by the processor 120, may enable the gaming server 116 to manage the various central determination games played by a player 112 at the gaming devices 108 (e.g., gaming device 108-*a* through gaming device 108-N) and/or a communication device 144 carried by the player 112. For example, any central determination game played by the player 112 at any of the gaming devices 108 and/or communication device 144 may be managed, partially or entirely, by execution of the game management instructions 132. The central determination game management instructions 132 may also be configured to track a status of wager events and whether a player 112 has placed a wager on such events. In some embodiments, when a wager event has come to completion such that wagers made on the event become payable (e.g., when the predetermined outcome is presented to the player by a gaming device 108 and/or communication device 144), the central determination game management instructions 132 may update states and/or values of tickets/vouchers issued for the event appropriately.

In some aspects, the central determination game management instructions 132, when executed by the processor 120, may enable the central determination gaming server 116 to manage and/or monitor data associated with a gameplay session at a gaming device 108. For example, the central determination gaming server 116 may support example aspects described herein of monitoring user information (e.g., member identification information, player club status, etc.), gameplay data (e.g., quantity of plays, quantity of spins, duration of gameplay, credits spent, credits earned, etc.), and other gameplay data described above. The central determination gaming server 116 may update the gaming device database 154, obtain information from the central determination gaming device database 154, and notify the game management instructions 132, etc.

The player profile management instructions 133, when executed by the processor 120, may enable the central determination gaming server 116 to manage one or more player profiles within the player profile database 148. In some embodiments, the player profile management instructions 133 may be configured to manage a player loyalty profile including settings for such player profiles, available wager credits for such profiles, determine player wager history, loyalty reward account balance, loyalty reward eligibility, and/or determine which, if any, tickets/vouchers are associated with a particular player. It should also be appreciated that the player profile management instructions 133 may be configured to manage player profiles of players that do not have loyalty accounts or any other predetermined player account.

In some aspects, the player profile management instructions 133, when executed by the processor 120, may be configured to manage a player activity, current and/or historical, associated with gameplay sessions.

In some aspects, the content generation event detection instructions 136, when executed by the processor 120, monitors gameplay data, gaming system state, and/or sensor input, detects a content generation event that triggers auto-generation of a prompt and content by the generative model.

The predetermined outcomes and prompts 138 comprise a library or pool of predetermined outcomes, each predetermined outcome corresponding to one or more prompts. The prompts comprise the associated outcome as well as other contextual information noted above.

In some aspects, the prompt generation instructions 140, when executed by the processor 120, determines a set of content preferences for a player, in response to the detected content generation event, generates, from at least part of the content preferences, a prompt to a generative model, and generates and provides a content generation request comprising the prompt to the generative model.

In some aspects, the content selection instructions 142 and presentation operation instructions 143, when executed by the processor 120, receive content generated by the generative model in response to the content generation request, selects at least a portion of the received content for presentation by one or more gaming devices in communication with the communication interface, selects one or more presentation operations for the selected at least a portion of the received content, and causes the received content to be presented by the one or more gaming devices to one or more players via one or more selected presentation operations.

In some aspects, the malicious content identification instructions 150, when executed by the processor 120, parses both player preferences and other received player input and the received auto-generated content for malicious content.

Some or all of the instructions or instructions stored in the memory 124 and some functions of the gaming server 116, gaming devices 108, and/or communication devices 144 may be implemented using machine learning techniques. In some embodiments, the neural network used by the prompt generation, content selection, and presentation operation selection model(s) and generative model may be, for example, a machine learning network and may include a machine learning architecture. In some aspects, the neural network may be or include an artificial neural network (ANN). In some other aspects, the neural network may be or include any machine learning network such as, for example, a deep learning network, a convolutional neural network, a long-short term memory (LSTM) neural network, or the like. In some cases, the machine learning techniques may include reinforcement learning. In some cases, the machine learning uses unsupervised learning techniques.

To enable selection of certain game events (such as generating a predetermined outcome using a seed), the gaming server 116 can include a pseudorandom number generator (PRNG) or random number generator (RNG) 160. The RNG or PRNG generates a sequence of numbers or symbols that cannot be reasonably predicted better than by random chance. RNGs are typically hardware random-number generators (HRNGs) that generate random numbers, wherein each generation is a function of the current value of a physical environment's attribute that is constantly changing in a manner that is practically impossible to model. In contrast, PRNGs generate numbers that only look random but are in fact pre-determined and can be reproduced simply by knowing the state of the PRNG.

Figure 2:
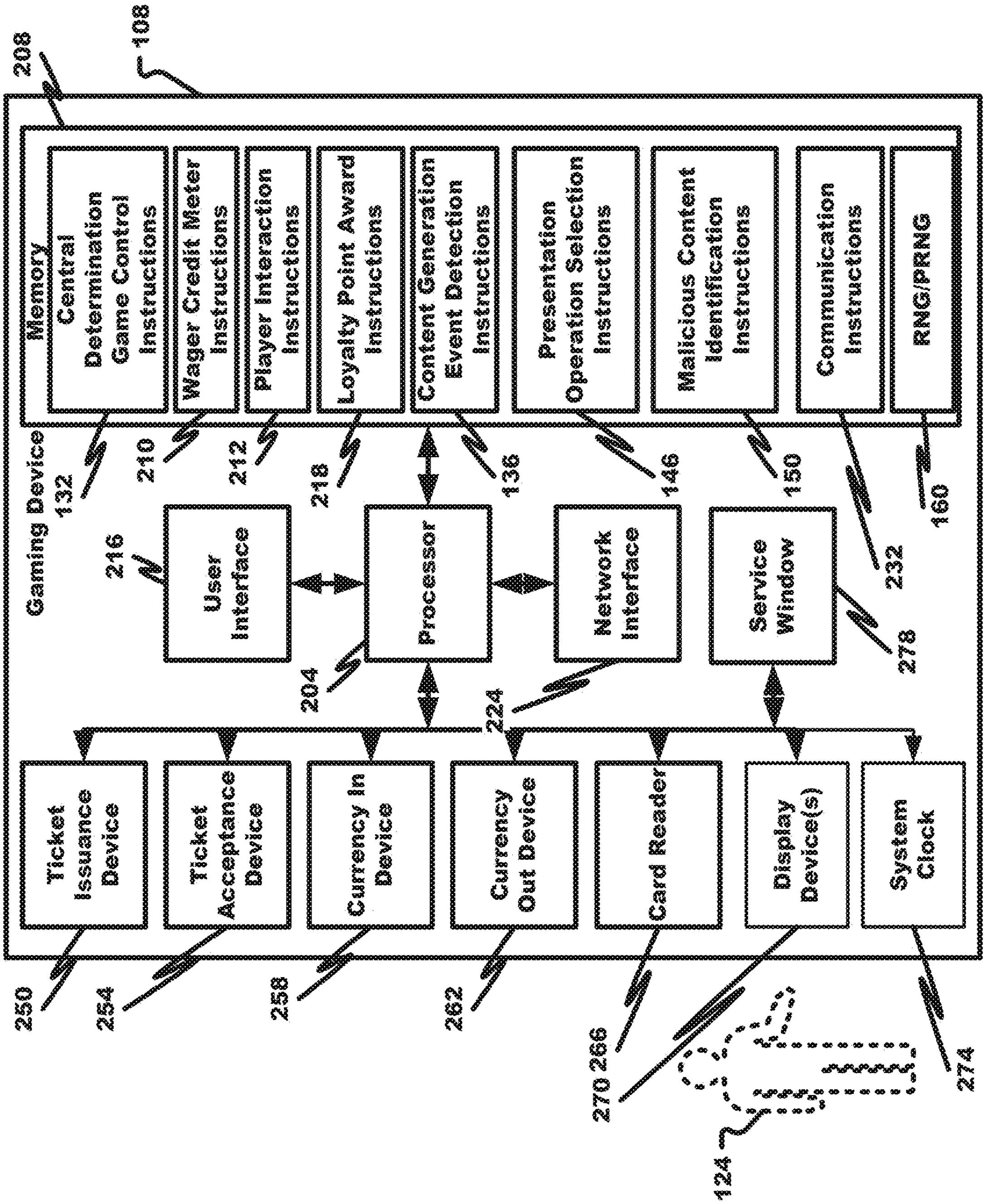
FIG. 2 is a block diagram of a gaming device in accordance with aspects of the present disclosure.
Figure 5:
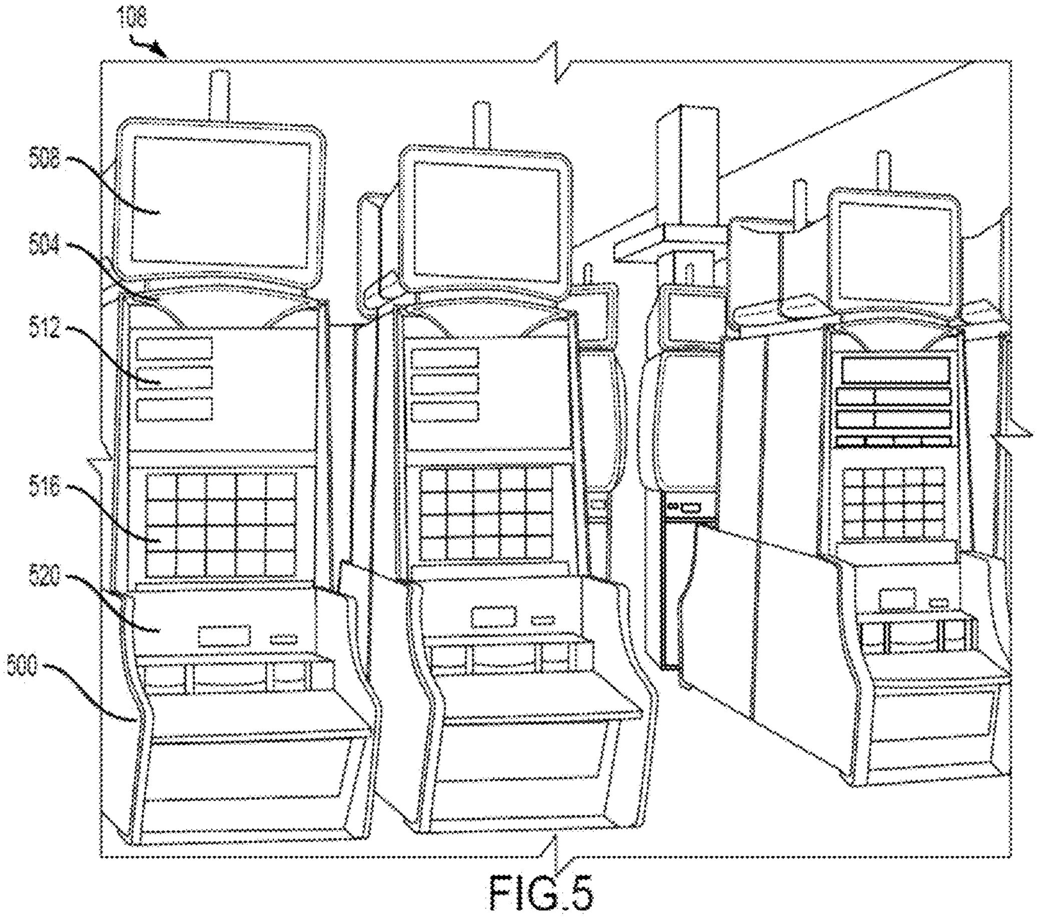
FIG. 5 is a view of a gaming device in accordance with aspects of the present disclosure.

With reference to FIGS. 2 and 5, additional details of the components that may be included in a gaming device 108 will be described in accordance with at least some embodiments of the present disclosure.

The gaming device 108 is depicted to include a processor 204, memory 208, a network interface 224, a user interface 216, a ticket issuance device 250, a ticket acceptance device 254, a currency-in device 258, a currency out device 262, a card reader 266, display device(s) 270, and system clock 274. In some embodiments, the processor 204 may include example aspects of the processor 120. In other words, the processor 204 may correspond to one or many microprocessors, CPUs, microcontrollers, or the like. The processor 304 may be configured to execute one or more instructions stored in memory 308.

The network interface 224 may include example aspects of network interface 128. The nature of the network interface 224, however, may depend upon whether the network interface 224 is provided in a gaming device 108 or a communication device 144. Examples of a network interface 312 include, without limitation, an Ethernet port, a USB port, an RS-232 port, an RS-485 port, a NIC, an antenna, a driver circuit, a modulator/demodulator, etc. The network interface 224 may include one or multiple different network interfaces depending upon whether the gaming device 108 is connecting to a single communication network 104 or multiple different types of communication networks 104. For instance, the gaming device 108 may be provided with both a wired network interface and a wireless network interface without departing from the scope of the present disclosure.

The user interface 216 may correspond to any type of input and/or output device that enables the player 112 to interact with the gaming device 108. As can be appreciated, the nature of the user interface 216 may depend upon the nature of the gaming device 108. For instance the user interface 216 may include one or more lights 504, LED, LED/LCD or touch-sensitive display screens 508, 512, and 516, one or more depressible buttons 500, a speaker, etc. In some cases, the user interface 216 may include a biometric scanning device (e.g., a fingerprint scanner) supportive of biometric inputs by a user. In some examples, the user interface 216 may include any combination of sensors 145 described with reference to FIG. 1 (e.g., an image sensor, an eye tracking sensor, a heart rate sensor, an infrared sensor, an audio sensor, a pulse sensor, an oxygen sensor, a temperature sensor, a pressure sensor, a touch screen sensor, a vibration sensor, a motion sensor, an accelerometer, etc.).

In some examples, the user interface 216 may include an interactive service window 520. Machine-to-machine communications and player input can be improved using the interactive service window. The service window has an electronic address on the gaming or communications network different from an address of the host gaming device itself, to exchange directly in bound and out bound electronic messages with the gaming server 116 and display content provided by the gaming server 116 to the player. The service window can slide into view either from the right, left, or top of the gaming display and offer interactive touch screen capabilities to the player. The content of the game theme on the display is unaffected or independent of the service window, which can be opened or closed by the player. The service window can be a fully interactive touch screen menu that players can use to activate bonus features, receive and send messages to the central determination gaming server 116, and view messages or advertisements from the central determination gaming server 116.

The memory 208 may include one or multiple computer memory devices that are volatile or non-volatile. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 208 may be configured to store the instructions depicted in addition to temporarily storing data for the processor 204 to execute various types of routines or functions. The instructions can enable user interaction with the gaming device 108 and game play at the gaming device 108. Examples of instructions that may be stored in the memory 208 include a central determination game control instructions 132, wager credit meter instructions 210, player interaction instructions 212, loyalty point award instructions 218, content generation event detection instructions 136, presentation operation selection instructions 146, malicious content identification instructions 150, communication instructions 232, and random number generator or pseudorandom number generator (collectively referenced as PRNG/RNG) 236 that is used by the game control instructions 160, for example, to provide game outputs.

The central determination game control instructions 132, content generation event detection instructions 136, presentation operation selection instructions 146, and malicious content identification instructions 150 have been discussed above.

The wager credit meter instructions 210, when executed by the processor 204, may enable the gaming device 108 to facilitate a tracking of activity at the central determination gaming system 100 for reporting to the gaming server 116 or patron manager. In some embodiments, the wager credit meter instructions 210 may be used to store or log information related to various player 112 activities and events that occur at the gaming device 108. The types of information that may be maintained in the wager credit meter instructions 210 include, without limitation, player information, available credit information, wager amount information, changes in wager credit meter balance as a function of time, and other types of information that may or may not need to be recorded for purposes of accounting for wagers placed at the gaming device 108 and payouts made for a player 112 during a game of chance or skill played at the gaming device 108. In some embodiments, the wager credit instructions 210 may be configured to track coin in activity, coin out activity, coin drop activity, jackpot paid activity, bonus paid activity, credits applied activity, external bonus payout activity, ticket/voucher in activity, ticket/voucher out activity, timing of events that occur at the gaming device 108, and the like. In some embodiments, certain portions of the wager credit meter instructions 210 may be updated in response to outcomes of a game of chance or skill played at the gaming device 108. In some embodiments, the gaming device 108 does not include a wager credit meter instructions 210.

The player interaction instructions 212 and content generation event detection instructions 136, when executed by the processor 204, detect player activity at the gaming device 108 and notifies the gaming server 116 or patron manager of an instance of detected player 112 interaction, a type of player 112 interaction detected, and a timestamp from a system clock and associated with the player 112 interaction and enable the gaming device 108 to monitor operations of components of the central determination gaming system 100 in response to interaction with players. The player gaming server 116 can use this input from the gaming device to detect content generation events, such as a predetermined gameplay activity by the player, a content preference associated with the player, a predetermined random or pseudorandom number, and a threshold loyalty point or credit meter balance associated with the player, that triggers auto-generation of content.

The loyalty point award instructions 218, when executed by the processor 204, applies promotional rules to the monitored operations to reward loyalty points to eligible players. These functions can also be performed by the patron manager independently of the gaming device or as part of the gaming server 116.

The gaming device 108 may be provided with appropriate hardware to facilitate acceptance and issuance of tickets/vouchers. Specifically, the gaming device 108 may be provided with a ticket acceptance device 254 that is configured to accept or scan physically-printed tickets/vouchers and extract appropriate information therefrom. In some embodiments, the ticket acceptance device 254 may include one or more machine vision devices (e.g., a camera, IR scanner, optical scanner, barcode scanner, etc.), a non-visual scanning device (e.g., an RFID reader, an NFC reader), a physical ticket acceptor, a shredder, etc. The ticket acceptance device 254 may be configured to accept physical tickets and/or electronic tickets without departing from the scope of the present disclosure. An electronic ticket/voucher may be accepted by scanning a visual code (e.g., a one-dimensional barcode, a two-dimensional barcode, any other type of barcode, a quick response (QR) code, etc.) displayed on a printed ticket/voucher or a communication device 144, for example. In another example, an electronic ticket/voucher may be accepted by scanning a tag (e.g., an RFID tag, an NFC tag, a contactless smart card, or the like) storing the ticket/voucher information.

The ticket issuance device 250 may be configured to print or provide physical tickets/vouchers to players 112. In some embodiments, the ticket issuance device 250 may be configured to issue a ticket/voucher consistent with an amount of credit available to a player 112, possibly as indicated within the credit meter. In some cases, the ticket/voucher may be an e-TITO voucher including a reprogrammable electronic display and an RFID tag.

The currency-in device 258 may include a bill acceptor, a coin acceptor, a chip acceptor or reader, or the like. In some embodiments, the currency-in device 258 may also include credit card reader hardware and/or software. In some aspects, the currency-in device 258 may include one or more machine vision devices (e.g., a camera, IR scanner, optical scanner, barcode scanner, etc.) or non-visual scanning devices (e.g., an RFID reader/writer, an NFC reader/writer).

The currency-out device 262, like the ticket issuance device 250, may operate and issue cash, coins, tokens, or chips based on an amount indicated within the credit meter. In some embodiments, the currency-out device 262 may include a coin tray or the like and counting hardware configured to count and distribute an appropriate amount of coins or tokens based on a player's 112 winnings or available credit within the credit meter. In some aspects, the currency-out device 262 may include one or more machine vision devices or non-visual scanning devices.

The card reader 266 may include hardware and/or software configured to read or accept any type of card, or portable credential (e.g., NFC, Bluetooth, Wi-Fi, etc.). In some embodiments, the card reader 266 may include hardware and/or software that enable contactless reading of a card, token, or portable credential. In some embodiments, the card reader 266 may include hardware and/or software that enable contact-based reading of a card, token, or portable credential (e.g., magstripe, chip reader, electrodes, card-receiving slot, etc.). It should be appreciated that the card reader 266 may be configured to receive and reader a card or portable credential, token, in any type of format (e.g., portable plastic card, magstripe card, key fob, etc.). It should also be appreciated that the card reader 266 may be configured to write information or data onto a card or portable credential. Furthermore, in some embodiments, the card reader 266 may be configured to read a player loyalty card in the form of a plastic credit-card shaped credential. In some embodiments, the card reader 266 may enable communications with a loyalty application operating on a player's personal gaming device.

The gaming device 108 may include one or more display devices 270, such as displays 508, 512, 516, and 520, configured to render information, live video, communications windows, wagering interface windows, games, interactive elements, and/or other visual output to one or more display screens. The gaming device 108 may include one or more display controllers configured to control an operation of the display device 270. This operation may include the control of input (e.g., player input via the user interface 216, command input via the instructions in memory 208, combinations thereof, etc.), output (e.g., display, rendered images, visual game behavior, etc.) and/or other functions of the display device 270.

In an embodiment, the display device 270 comprises one or more display screens that are configured to selectively activate pixels and/or display elements to render one or more games, windows, indicators, interactive elements, icons, characters, lights, images, etc. Non-limiting examples of the display screen may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens may be separated into a main display and a secondary display.

In an embodiment, the display device 270 comprises one or more projectors to project virtual reality or augmented reality images during the escape room game. The projector (s) can be any projecting device that can project a computer image onto a projection augmented model (PA model) and/or a spatially augmented reality (SAR) model to provide the players 124 with augmented reality, augmented virtuality, and/or virtual reality computer-generated game environments. As will be appreciated, projection mapping, video mapping or SAR typically uses one or more optical devices or projectors that project a beam of light onto a selected escape room space to provide the player with the augmented reality, augmented virtuality, and/or virtual reality computer-generated game environments.

In an embodiment, the display device 270 comprises head-mounted displays worn by the players 112 to view the augmented reality, augmented virtuality, or virtual reality computer-generated game environments.

The display device 270 may include a display driver, a power supply, an input/output, and/or other components configured to enable operation of the display device 270. The display driver may receive commands and/or other data provided by the processor 204 and one or more of the instructions in memory 208. In response to receiving the commands, the display driver may be configured to generate the driving signals necessary to render the appropriate images to the display screen. The power supply may provide electric power to the components of the display device 270. In some embodiments, the power supply may include a transformer and/or other electronics that prevent overloading, condition power signals, and/or provide backup power to the display device 270. The input/output may correspond to one or more connections for receiving or exchanging information and/or video from components of the gaming device 108. The input/output may include an interconnection to the network interface 224. By way of non-limiting example, the input/output may include a high-definition multimedia interface (HDMI) input, Ethernet, composite video, component video, H.264, or other video connection.

Figure 8:
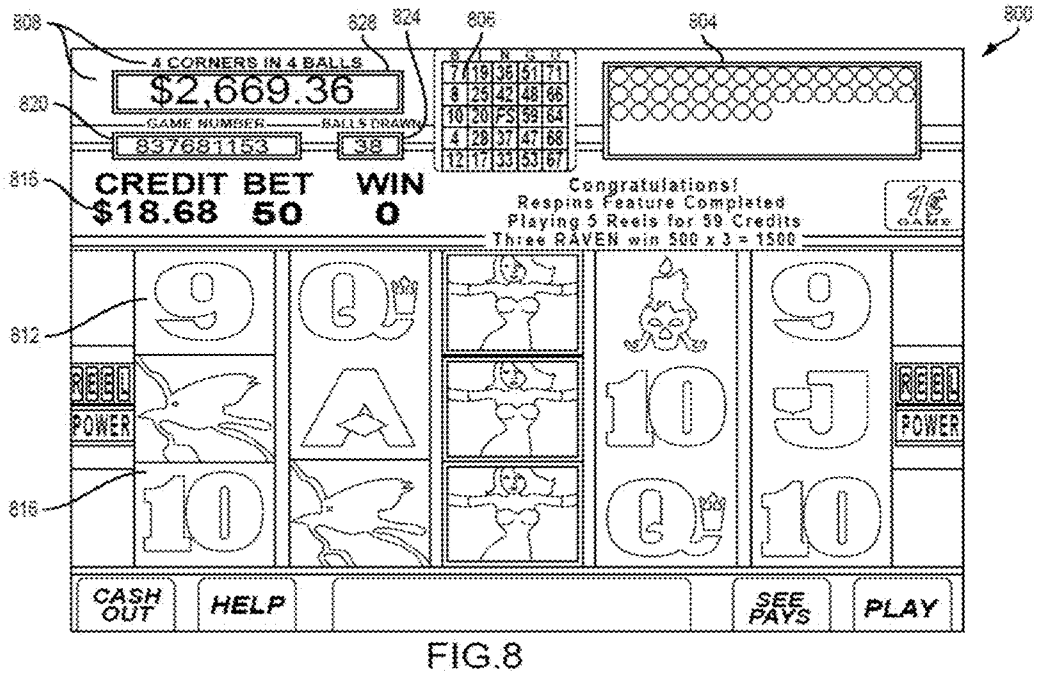
FIG. 8 is a screenshot of a gaming device display in accordance with aspects of the present disclosure.

FIG. 8 is an exemplary display 800 of a display device 270 in connection with a Class 2 game. The display 800 shows a Bingo game. The primary display portion 808 comprises plural slot symbols 812 on plural reels 814 and the secondary display portions 806 and 804 display the Bingo card along with a ball draw, respectively. The daubing of numbers from the ball draw in the secondary display region 804 on the Bingo card displayed in the secondary display region 806 will determine the player's win amount (or some portion of it) shown in the primary display portion 808, and the payline outcome of the slot game shown by the slot symbols 812 and reels 816 will match the win from the bingo game. The primary display portion comprises additional information such as first information 816 providing the current value in the credit meter (e.g., credit of $18.68, bet $0.50, and win 0), second information 820 comprising the game number, third information 824 comprising the number of balls drawn, and fourth information 828 comprising the potential award.

The generated content can be displayed in any of the primary or secondary display portions 808, 804 and 806 as well as any sub-portion thereof, such as a slot symbol 812. By way of illustration, game logic may be selective about where generative AI or auto-generated content is rendered. Even in other cases where the game is built to support use of content in many aspects of a game (such as the reel symbols, or for representations of winning amounts), the game is commonly coded with hooks or designated areas where content is integrated into the display logic of the game, and the prompts must include proper context so that the images created using generative AI can be properly understood and integrated into the game in the appropriate way (location, etc). Where a game is composed of reel strips numbered 1 through 3 and each reel contains 20 symbols, the generative AI prompt may contain specific instructions that allow the game or system to understand which reel strip should be put into the game in specific display locations. For example, a prompt may say "Provide me a win for an Egyptian slot machine game with a win of $100. The Egyptian slot machine game is a three-reel slot game, with 20 symbols per reel strip. For the resulting images, please name them uniquely using filenames where the first character in the output filename describes the reel strip number, followed by an underscore, followed by the number of the symbol in the reel strip. Assume reel strip numbers start at 1 and symbol numbers start at 1." This prompt would not only provide auto-generated content but also specify where in the display the content is to be rendered. The prompt may alternatively or additionally ask the generative AI model to output a machine-readable format, such as a JSON formatted output, which references the images, audio, or other AI generated content.

Returning to FIG. 2, the gaming device 108 can further include a system clock 274 for timestamp creation. The system clock can be implemented in hardware (e.g., a quartz crystal oscillator) or software that generates and sends out a timing signal on a regular or periodic basis to all other computer components of the gaming device 108 to synchronize the various components operations. In some embodiments, the gaming device 108 comprises both a hardware clock known as the Real Time Clock and a software clock.

In some embodiments, the gaming device comprises a service window 278 controlling one or more of the display devices that exchanges electronic messages with the gaming server 116 and controls one or more of the display device(s) 270.

Figure 3:
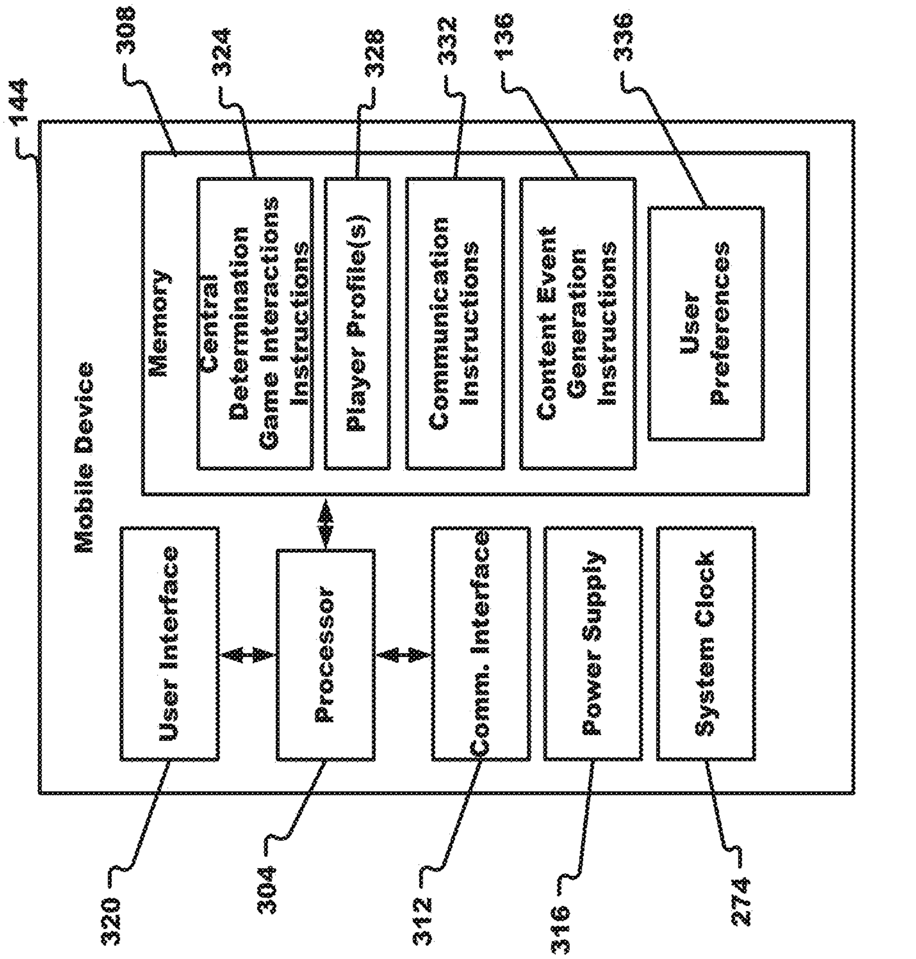
FIG. 3 is a block diagram of a mobile device in accordance with aspects of the present disclosure.

With reference now to FIG. 3, additional details of the components that may be included in a mobile device 144 will be described in accordance with at least some embodiments of the present disclosure. The mobile device 144 is shown to include a processor 304, memory 308, a communication interface 312, and a user interface 320. In some embodiments, the processor 304 may be similar or identical to any of the other processors 120 depicted and described herein and may correspond to one or many microprocessors, CPUs, microcontrollers, Integrated Circuit (IC) chips, or the like. The processor 304 may be configured to execute one or more instructions stored in memory 308. In some embodiments, the instructions stored in memory 308, when executed by the processor 304, may enable the mobile device 144 to provide game play functionality, interact with gaming machines 108, pair with gaming machines 108, or any other type of desired functionality.

The communication interface 312 may be similar or identical to the network interface 224 and/or communication interfaces 312 depicted and described herein. The nature of the communication interface 312 may depend upon the type of communication network 108 for which the mobile device 144 is configured. Examples of a suitable communication interfaces 312 include, without limitation, a WiFi antenna and driver circuit, a Bluetooth antenna and driver circuit, a cellular communication antenna and driver circuit, a modulator/demodulator, etc. The communication interface 312 may include one or multiple different network interfaces depending upon whether the mobile device 144 is connecting to a single communication network 108 or multiple different types of communication networks. For instance, the mobile device 144 may be provided with both a wired communication interface 312 and a wireless communication interface 312 without departing from the scope of the present disclosure.

The user interface 320 may include a combination of a user input and user output device. For instance, the user interface 320 may include a display device, a microphone, a speaker, a haptic feedback device, a light, a touch-sensitive display, a button, or a combination thereof. The user interface 320 may also include one or more drivers for the various hardware components that enable user interaction with the mobile device 144.

The memory 308 may be similar or identical to other memory 208, 308 depicted and described herein and may include one or multiple computer memory devices that are volatile or non-volatile. The memory 308 may be configured to store instructions that enable player interaction with the mobile device 144 and that enable game play at the mobile device 144. Examples of instructions that may be stored in the memory 308 include a central determination game interaction instructions 324, player profile(s) 328, content event generation instructions 136, user preferences 336, and a communication instructions 332. In addition to the instructions, the memory 308 may also be configured to store data that is useable by the various instructions.

In some embodiments, the central determination game interaction instructions 324, when executed by the processor 304, may enable the mobile device 144 to facilitate one or more games of chance or skill and management of one or more player engagement indicator sets.

The player profile(s) 328 include a variety of player-specific data structures including player identification and login credentials.

The communication instructions 332, when executed by the processor 304, may enable the mobile device 144 to communicate via the communication network 108. In some embodiments, the communication instructions 332 may be similar or identical to the communication instructions 232 and may be particular to the type of communication network 108 used by the mobile device 144. As an example, the communication instructions 332 may be configured to enable cellular, WiFi, and/or Bluetooth communications with other devices. The communication instructions 332 may follow predefined communication protocols and, in some embodiments, may enable the mobile device 144 to remain paired with a gaming machine 108 as long as the mobile device 144 is within a predetermined proximity (e.g., 20-30 feet, an NFC communication range, or a Bluetooth communication range) and paired with the gaming machine 108. In some embodiments, the communication instructions 332 enables a mobile device application of the mobile device to negotiate a secure, authenticated connection with the proper functionality, versions and security settings.

The user preferences 336 may correspond to gaming or wager or player engagement preferences that are desired by the player 124 of the mobile device 144, including content preferences.

The mobile device 144 is also shown to include a power supply 316. The power supply 316 may correspond to an internal power supply that provides AC and/or DC power to components of the mobile device 144. In some embodiments, the power supply 316 may correspond to one or multiple batteries. Alternatively or additionally, the power supply 316 may include a power adapter that converts AC power into DC power for direct application to components of the mobile device 144, for charging a battery, for charging a capacitor, or a combination thereof.

Figure 4A:
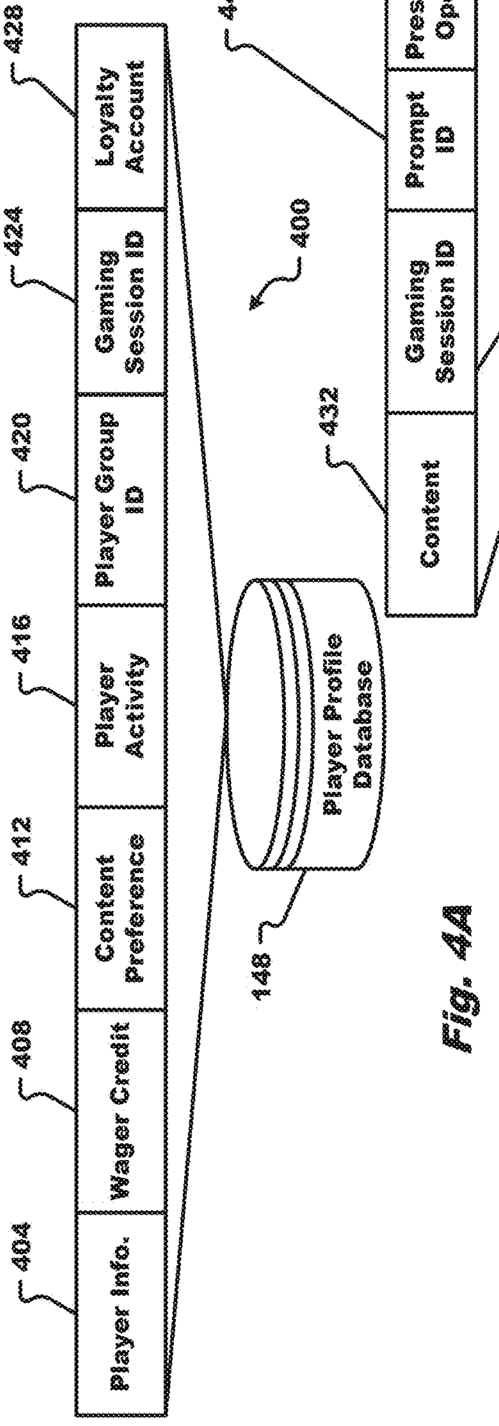
FIG. 4A is a block diagram illustrating a first example data structure used in accordance with aspects of the present disclosure.
Figure 4B:
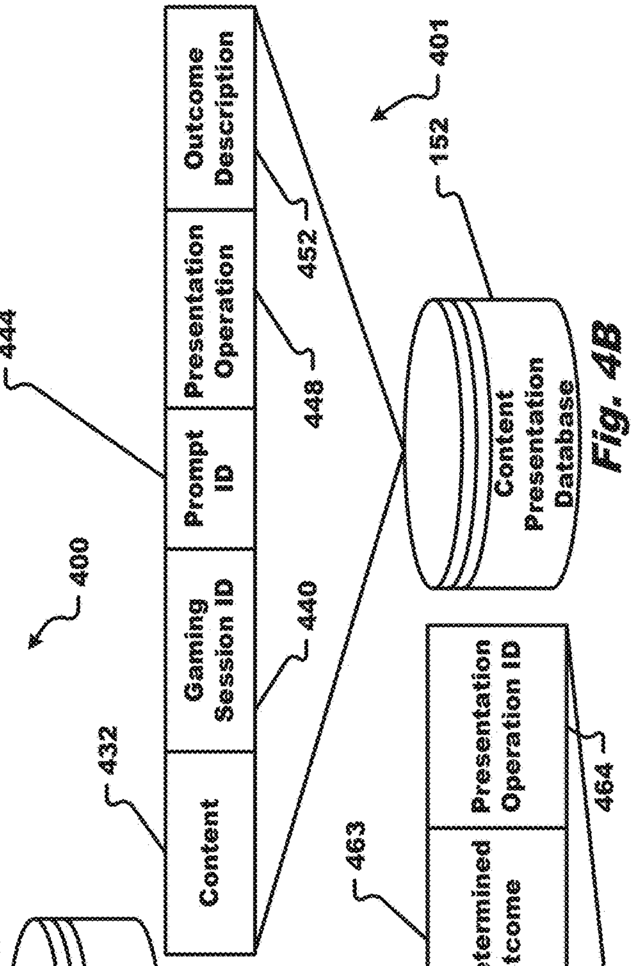
FIG. 4B is a block diagram illustrating a second example data structure used in accordance with aspects of the present disclosure.
Figure 4C:
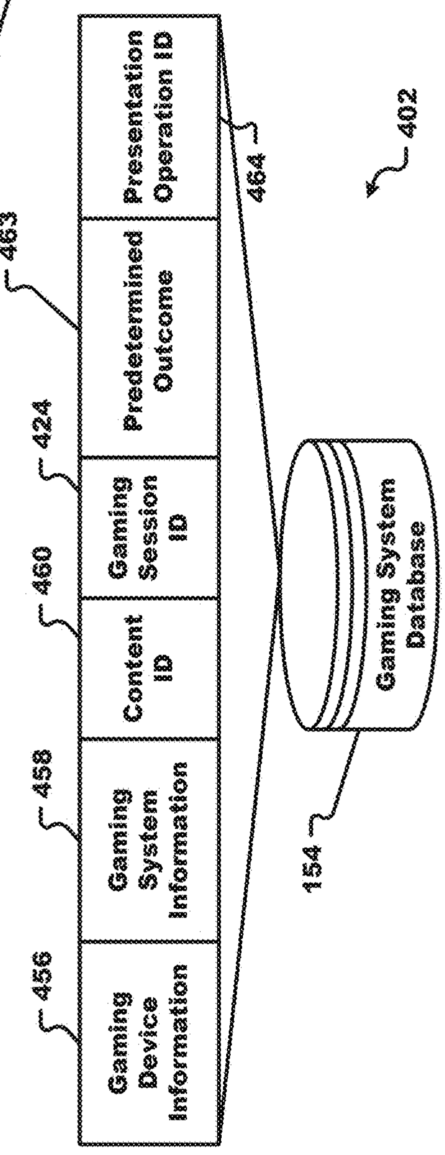
FIG. 4C is a block diagram illustrating a third example data structure used in accordance with aspects of the present disclosure.

With reference now to FIGS. 4A through 4C, additional details of data structures will be described in accordance with at least some embodiments of the present disclosure. It should be appreciated that the data structures depicted and described herein may be stored within a central database or may be distributed among a number of data storage nodes. Alternatively or additionally, some or all of the fields of the data structures may be maintained in devices of the gaming system 100 such as the gaming server 116, a gaming device 108, and/or a communication device 144*a,b* without departing from the scope of the present disclosure.

With reference initially to FIG. 4A, details of a data structure 400 that may be maintained as part of a player profile will be described in accordance with at least some embodiments of the present disclosure. The database 148 may be configured to store one or multiple data structures 400 that are used in connection with tracking player progress and gaming history. In some embodiments, the data stored in the data structure 400 may be stored for a plurality of different player profiles or for a single player profile. As a non-limiting example, the data structure 400 may be used to store player loyalty information, player activity information, and the like. Even more specifically, the data structure 400 may include a plurality of data fields that include, for instance, a player information field 404, a wager credit field 408, a content preference field 412, a player activity field 416, a player group ID field 420, a gaming session ID field 424, and a loyalty account field 428.

The player information field 404 may be used to store any type of information that identifies a player or a group of players. In some embodiments, the player information field 404 may store one or more of username information for a player 112, password information for a player account, player status information, contact information for the player, accommodations associated with the player 112, and any other type of customer service management data that may be stored with respect to a player 112.

The wager credit field 408 may be used to store data about the available credit of a player 112 with a device, with a sports book, with a casino, and/or with a plurality of casinos. For instance, the wager credit field 408 may store an electronic record of available credit in the player's account and whether any restrictions are associated with such credit. The wager credit field 408 may further store information describing a player's available credit over time, cash out events for the player, winning events for the player 112, wagers placed by the player 112, tickets/vouchers issued to the player 112, and the like.

The content preference field 412 may be used to store data about one or more content preferences of a player 112. For instance, the content preferences include whether or not the player opts in or out of using his or her content preferences for auto-generation of content, content preferences obtained from monitoring activity of the player with respect to the gaming system, content preferences obtained by monitoring player posted content on a social media server 188, and content preference inputted by the player for use in auto-generating images.

The player activity field 416 may be used to store historical data for events that occur with respect to the player 112 (e.g., gameplay data associated with gameplay sessions of the player 112). For example, the player activity field 416 may store information associated with the player 112 in relation to an outcome in a game of chance, an outcome in a game of skill, a celebration event for a person other than the player 112, involvement in a celebration event, visits to a predetermined location, gameplay information with respect to a particular game, player interactions with a communication device 144, player interactions (e.g., gameplay decisions, player feedback with respect to a baseline player behavior, etc.) with a gaming device 108, wagers placed by the player 112, tickets/vouchers issued for the player 112, tickets/vouchers redeemed by the player 112, etc.

In some aspects, the player activity field 416 may store sensor data (e.g., biometric data, pressure sensor data, etc. described herein) associated with a player in relation to gameplay sessions. For example, the player activity field 416 may store sensor data associated with gameplay data (e.g., gameplay behavior, gameplay decisions, etc.) and/or gameplay events (e.g., gameplay decision events, gameplay outcomes, gameplay recommendations or predictions by a player behavior model linked to the player, etc.).

The player group ID field 420 may store information associated with a representative player group of which the player is a member. In one embodiment, the group ID is a cluster ID generated from the unlabeled set of player information. The group ID may describe the representative group and its members along with sessions historically or currently being played by the members or comprise an ID that references another data field containing this information. The group ID may be used to associate a given player with content generated for other players of the same representative player group.

The gaming session ID field 424 may store an identifier of a gaming session in which the player is involved. The gaming session ID may be generated by the gaming system to reference another data field further describing the gaming session.

The loyalty account field 428 may store information regarding the corresponding player's loyalty account status and other information, such as player loyalty tier ranking (e.g., gold, silver, bronze, etc.).

With reference now to FIG. 4B, details of another data structure 401 that may be used within the central determination gaming system 100 will be described in accordance with at least some embodiments of the present disclosure. The database 152 may be configured to store one or multiple data structures 401 that are used in connection with AI-based models. Even more specifically, the data structure 401 may include a plurality of data fields that include, for instance, a content field 432, gaming session ID field 440, prompt ID field 444, presentation operation field 448, and outcome description field 452.

The content field 432 may include any information related to a corresponding auto-generated content. In some aspects, the content field 432 may store any data associated with an auto-selected generated content. For example, the content field 432 may store data associated with the selected content such as one or more of an identifier (ID) assigned to the selected content, prompt (or the seed) corresponding to the selected content, presentation operation modified by the selected content, and outcome associated with the selected content. The data may be used to develop and train baseline models, modified versions of the AI-based models, or the like.

The gaming session ID field 440 may be an identifier of the gaming session in which the content in associated content field 432 was presented.

The prompt ID field 444 may be an identifier of the prompt used to generate the associated content in the content field 432.

The presentation operation field 448 may include any data describing or associated with a presentation operation modified by the selected content. The field may include meta data tags describing the presentation operation, such as an identifier of the corresponding presentation operation(s) modified by the selected content.

The outcome description field 452 may include any data describing an outcome associated with the selected content or the pairing of the selected content with the presentation operation. The outcome typically includes an outcome description indicating whether or not the content and associated content modified presentation operation produced a desirable or undesirable outcome for the gaming system and players. The outcome for instance can indicate a level of gameplay of and/or wagering one or more players while the content is rendered, a level of popularity of the game as modified by the content, a level of occupancy of gaming devices providing the game modified by the content, other gameplay or loyalty data, and the like.

With reference to FIG. 4C, details of a data structure 402 that may be maintained as part of a gaming device profile will be described in accordance with at least some embodiments of the present disclosure. The gaming system database 154 may be configured to store one or multiple data structures 402 that are used in connection with tracking a gameplay mode of a gaming device 108. In some embodiments, the data stored in the data structure 402 may be stored for a plurality of different gaming devices 108 or a single gaming device 108. As a non-limiting example, the data structure 402 may be used to store gaming device information, and the like. Even more specifically, the data structure 402 may include a plurality of data fields that include, for instance, a gaming device information field 456, a gaming system information field 458, a content ID field 460, a gaming session ID field 424, a predetermined outcome field 463, and presentation operation ID field 464.

The gaming device information field 456 may be used to store any type of information that identifies a gaming device 108 or a group of gaming devices 108. In some embodiments, the gaming device information field 456 may store identification information for a gaming device 108 (e.g., a unique serial number assigned to the gaming device 108) and any other type of gaming device management data that may be stored with respect to a gaming device 108.

The gaming system information field 458 may be used to store any type of gameplay and other gaming information including granular and/or summarized gameplay data, gaming system (e.g., casino floor) map showing gaming device location and current usage (e.g., heat map), game theme, game or gaming session type, and the like.

The content ID field 460 may be an identifier of the content field 432, such as a database link or address of the field 432.

The gaming session ID field 424 was discussed above.

The predetermined outcome field 463 may include a predetermined outcome associated with the gaming session ID in the field 424. The field 463 may comprise a seed that produces the predetermined outcome when processed by the RNG/PRNG 160 of the gaming device identified in the gaming device information field 456, an indicator of whether or not the game is a win or loss, an award amount with $0 representing a loss, and/or other information related to the predetermined outcome.

The presentation operation ID field 464 may be an identifier of the presentation operation field 448, such as a database link or address of the field 448 to indicate which presentation operation(s) were modified by the content in content ID field.

A number of examples of auto-generated content and associated prompts will be discussed to demonstrate the present disclosure.

Figure 6:
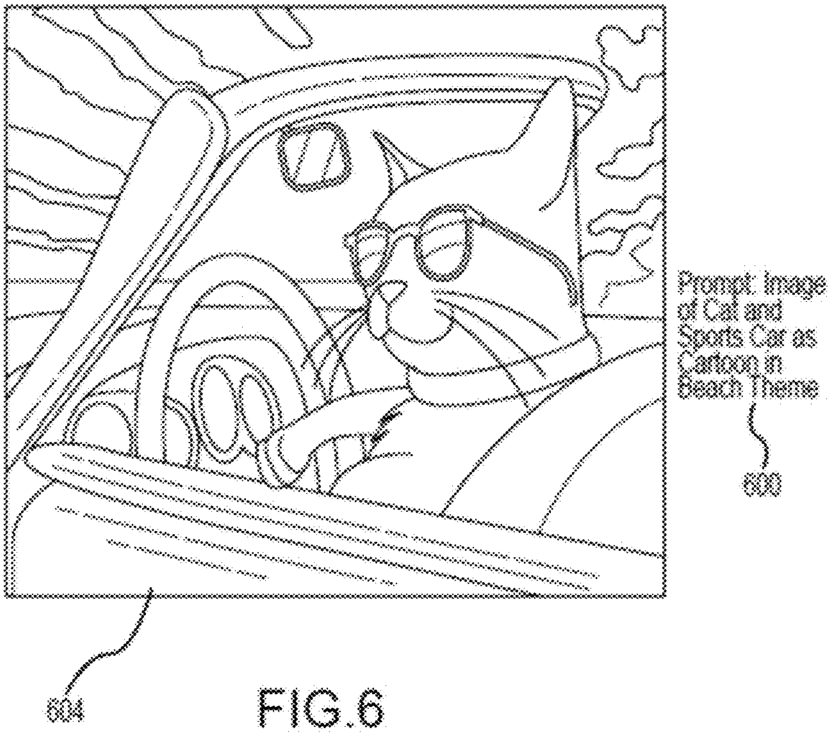
FIG. 6 is a screenshot of a prompt and associated generated content in accordance with aspects of the present disclosure.

With reference to FIG. 6, a text prompt 600 comprising text regarding an image of cat and sports car in beach game theme was used by the generative model to generate the image 604. The prompt 600 results from a player having a first content preference, namely images of cats; and a second content preference, namely images of sports cars; and the gaming system operator configuring the gaming devices being played by the first and second players in a beach game theme.

Figure 7:
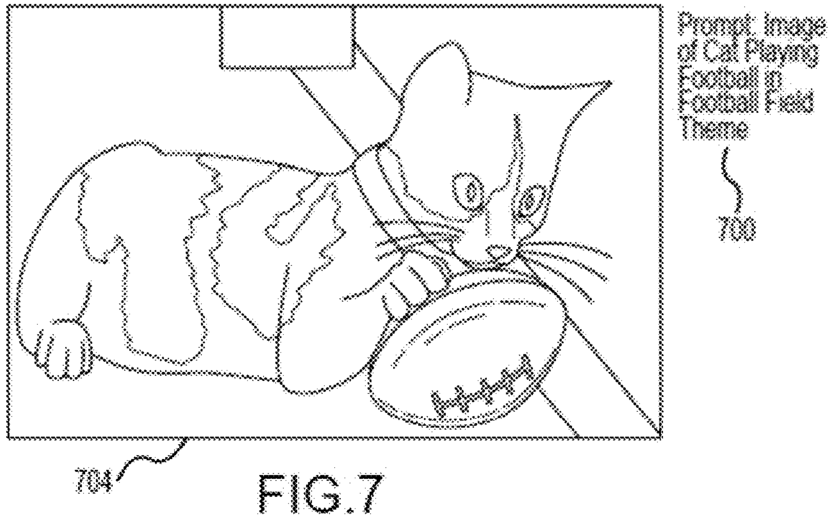
FIG. 7 is a screenshot of a prompt and associated generated content in accordance with aspects of the present disclosure.

Another example is illustrated in FIG. 7 in which a text prompt 700 comprising text regarding an image of cat playing football in a football field game theme was used by the generative model to generate the image 704. The prompt 700 results from the player having the first content preference, namely images of cats; and a third content preference, namely images of football related objects; and the gaming system operator configuring the gaming devices being played by the first and second players in a football game theme.

The prompt can be in any format. The prompt can be text, image, music, audio, and video information and a combination thereof. Prompts can be in any format, such as binary, XML, json or other format that can provide the information desired. The prompt is typically based, in part, on a content preference of an individual player and the predetermined outcome for a gaming session in which the content is to be presented.

In another example in accordance with at least some embodiments of the present disclosure, the auto-generated content is created for a player at the beginning of a gaming session. When the player cards in, the content is auto-generated by the generative model for that player. Since generating the content takes time, the player can play a game without the auto-generated content until the content is ready at which point one or more presentation operations of the game can be modified to include the selected generated content.

In another example in accordance with at least some embodiments of the present disclosure, the gaming system triggers auto-generation of content before the player starts a gaming session. For example, when the gaming system detects a trigger event such as the player's presence, the gaming system triggers auto-generation of the content so that the content is ready for the player. The triggering event could come, for instance, from a loyalty activity, such as the player checking in at a hotel desk associated with the gaming system. The trigger could come from the gaming system wirelessly detecting the presence and/or location of the player's mobile phone or the mobile phone application in spatial proximity to the gaming system. The trigger could come from sensing biometric identification of the player, such as one or more of the sensors 145 performing facial recognition that the player is in the casino or near the gaming area.

In another example in accordance with at least some embodiments of the present disclosure, the gaming system triggers auto-generation of the content in response to a player gaming activity reaching some threshold, such as wagering a certain amount of money or a period of time, winning a certain amount of money over a period of time or triggering a bonus. For example, the player wagers $1,000 in one hour so the gaming system triggers auto-generation of content for the player.

In another example in accordance with at least some embodiments of the present disclosure, the gaming system triggers auto-generation of the content when the gaming system learns something new about the player that constitutes a new content preference. For example, the player updates their account with the casino or posts on social media. The gaming system now has an additional content preference about the player so the gaming system generates new content based on this information. In a similar embodiment, the trigger comes from the gaming system analyzing and categorizing the player's activity and in response generates new content. For example, the gaming system analyzes the player's content and determines that the player is a high roller. The gaming system, in response, generates new content for a player based on this information. Triggers of this category could also include the player joining a loyalty club, playing games, or using casino services or engaging in other loyalty activities.

In another example in accordance with at least some embodiments of the present disclosure, the auto-generated content is used by the player indefinitely or for a predetermined period of time or until a termination event occurs, such as the duration of a current gaming session, the duration of a visit to the casino, or for a fixed period of time (e.g., one week). The termination event can be detected by the gaming system, such as the player carding out, leaving a defined spatial area, checking out of a hotel, or cashing out the credit meter.

In another example in accordance with at least some embodiments of the present disclosure, the player can extend the period of time the content is available through gaming activities. For example, the time period is extended another day for each day the player continues to gamble or use casino services.

In another example in accordance with at least some embodiments of the present disclosure, the player can trigger the auto-generation of content using player loyalty points. This could be achieved using the service window of the gaming device.

In another example in accordance with at least some embodiments of the present disclosure, the auto-generation of content is throttled such that the gaming system only auto-generates content at a certain frequency or at certain clock values, such as a limit of once per day or in response to occurrence of predetermined gaming system states.

In another example in accordance with at least some embodiments of the present disclosure, once the player is determined to be eligible the gaming system prompts the player if he or she wants to trigger auto-generation.

Real time generation of content will now be discussed with reference to FIGS. 10 and 13, each of which depicts signal flows between various gaming system components. The player 112 initiates a gaming session with the gaming device 112 as shown by the play request 1000.

Figure 10:
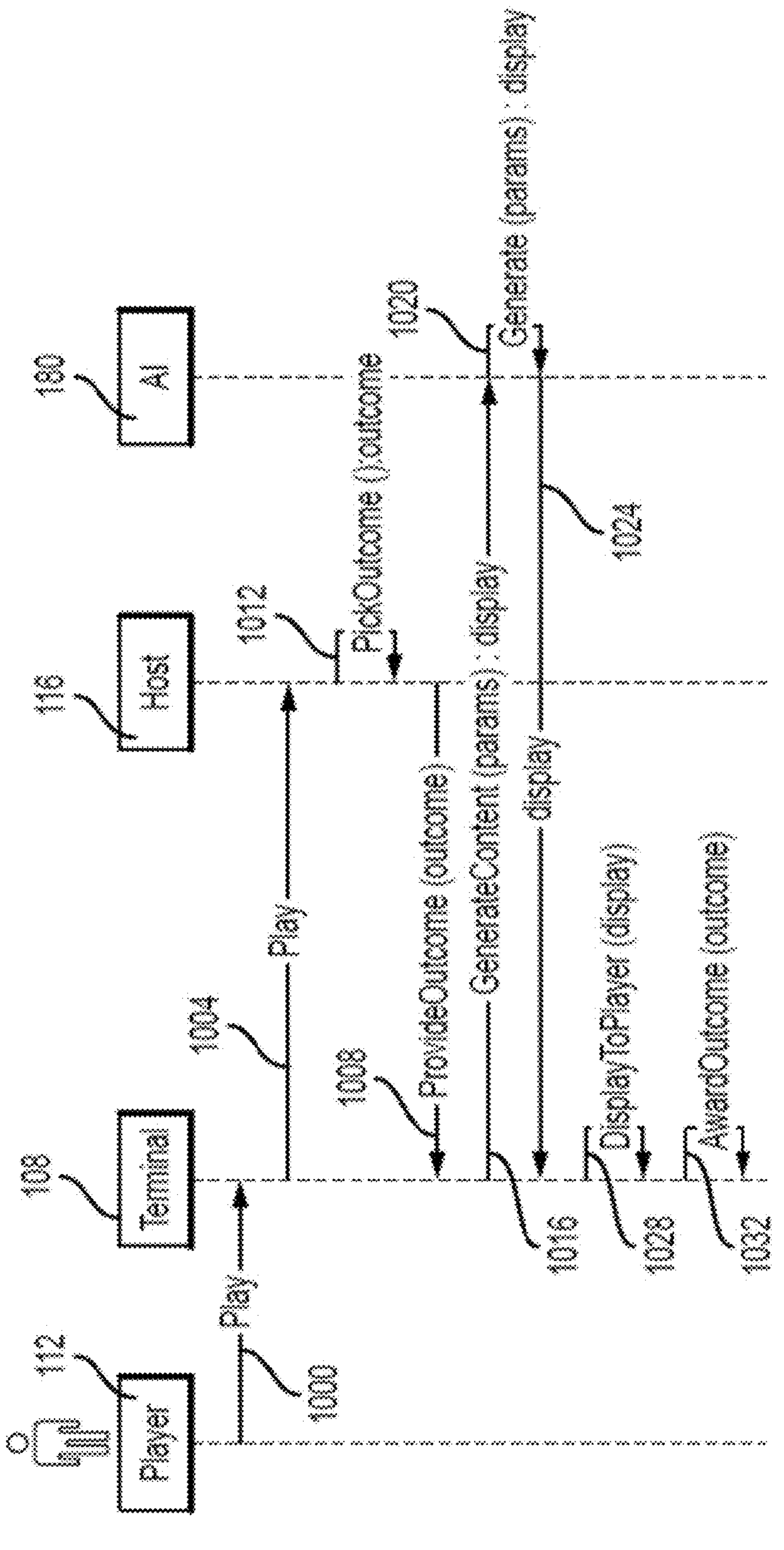
FIG. 10 is a block diagram illustrating component interactions in content generation in accordance with aspects of the present disclosure.

With reference to FIG. 10, depicts the signal flows FIG. 6 for an embodiment of the present invention. The gaming device 108 receives a request 1000 from a player 112 to initiate a game or perform an action in an existing game. The gaming device 112, in response, optionally 1004 sends an enrollment message to enroll in a central determination system pool. The enrollment message includes bet or wager information that may specify the game, the denomination, lines played, credits per line (or other analogous parameters in that game, such as cards or hands played), game session identifier, player identifier, game location etc, Once enrolled in the central determination system pool, the gaming device 108 requests 1004 from the gaming server 116, the gaming server 116 in response selects 1012 an outcome (e.g., monetary outcome), and the gaming device 108 receives 1008 from the gaming server 116 the predetermined game outcome from the finite pool of game outcomes in the pool file. The gaming device 108 then generates a prompt and includes the prompt in a content generation request 1016 sent to the generative model 180. The generative model generates 1020 the content (including the content parameters and display instructions) and sends 1024 the generated content to the gaming device 108. The gaming device 108 displays 1028 the generated content on a display device, and updates 1032 the display to reflect the award outcome.

Figure 13:
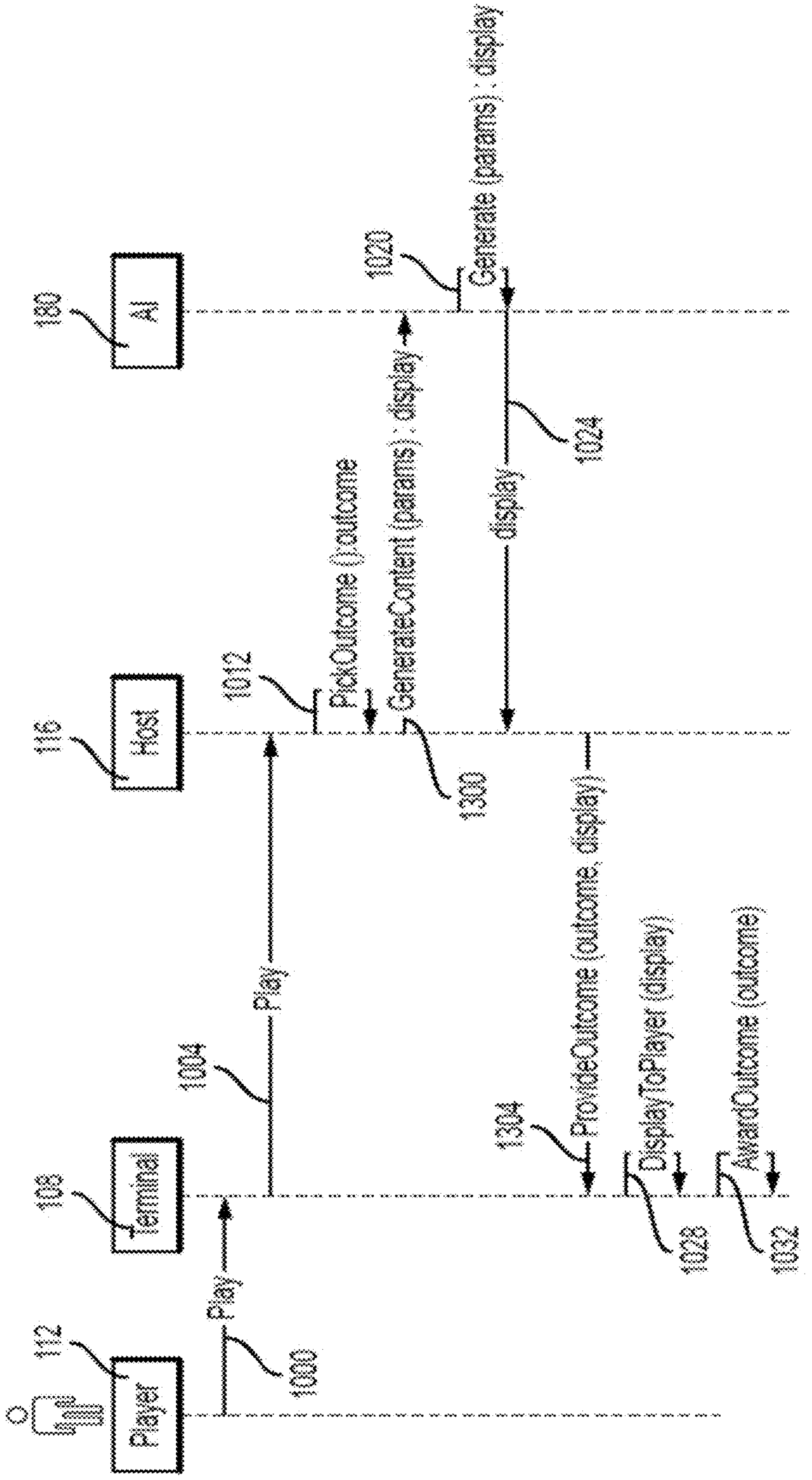
FIG. 13 is a block diagram illustrating component interactions in content generation in accordance with aspects of the present disclosure.

With reference to FIG. 13, unlike the embodiment of FIG. 10 content generation is requested by the gaming server 116 rather than the gaming device 108. Specifically, after receiving the outcome request 1004 and selecting 1012 a predetermined outcome from the outcome pool, the gaming server 116 generates a prompt and includes the prompt in a content generation request 1300 sent to the generative model 180. The generative model generates 1020 the content (including the content parameters and display instructions) and sends 1024 the generated content to the gaming server 116. The gaming server 116 then provides 1304 the selected predetermined outcome and generated content to the gaming device 108.

Figure 15:
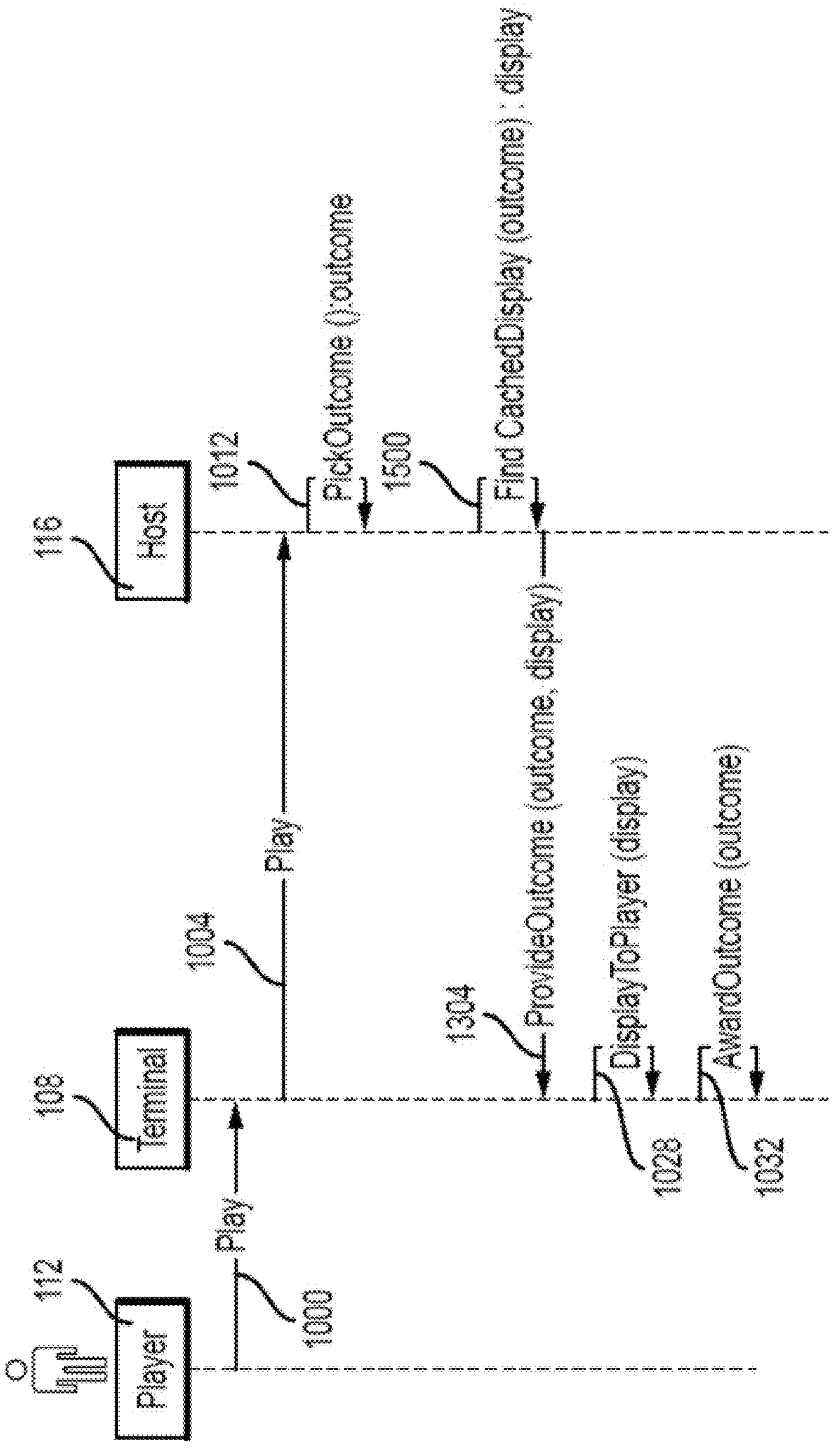
FIG. 15 is a block diagram illustrating component interactions in content generation in accordance with aspects of the present disclosure.

In some embodiments, some or all the auto-generated content is cached and therefore created up front or before the game display. This could assist with current bandwidth and content generation delays. It may also help minimize the cost associated with running the generative AI tools required for such a feature. FIGS. 14-15 depict an embodiment in which generated content is cached to avoid latency between generating and presenting content to a player 112.

With reference to FIG. 14, the gaming server 116 receives generated content from the generative model 180 and caches the content. The gaming server 116 can use a stored list of prompts while in other embodiments, the gaming server 116 retrieves the prompts from the gaming device (not shown). Prior to game play, in this case on connection 1400, the Host retrieves each prompt, prompt-by-prompt, from the stored game data as shown by the folder 1404. Specifically, for each prompt the gaming server 116 requests generative content by sending a content generation request 1408 to the generative model 180 and stores 1412 the received content for each prompt for later use.

With reference to FIG. 15, the gaming server 116 finds 1500 cached generated content from a previously generated library of prompt-indexed content and sends the selected content to the gaming device as noted above. In one embodiment, the central determination gaming system 100 generates new cached content after expiration of a certain amount of time, certain number of games played, certain amount of win/loss/pay, after a generative model update, or at the request of an operator or regulator. Such updates can keep the generated content fresh and changing to maintain high levels of player excitement.

In some embodiments, the auto-generated content is only selectively selected, such as for wins over a certain threshold, such as more than $1,000. All other wins (or losses) are still provided by the game logic and not by a generative model.

In some embodiments, the auto-generated content is only be associated with wins from an in-game bonus (e.g., free spin bonus, pick X of Y bonus, etc). This can emphasize use of the auto-generated content where it has the most impact.

As will be appreciated, the gaming device 108 can cache content in addition to or in lieu of content caching by the central determination gaming server 116.

Figure 11:
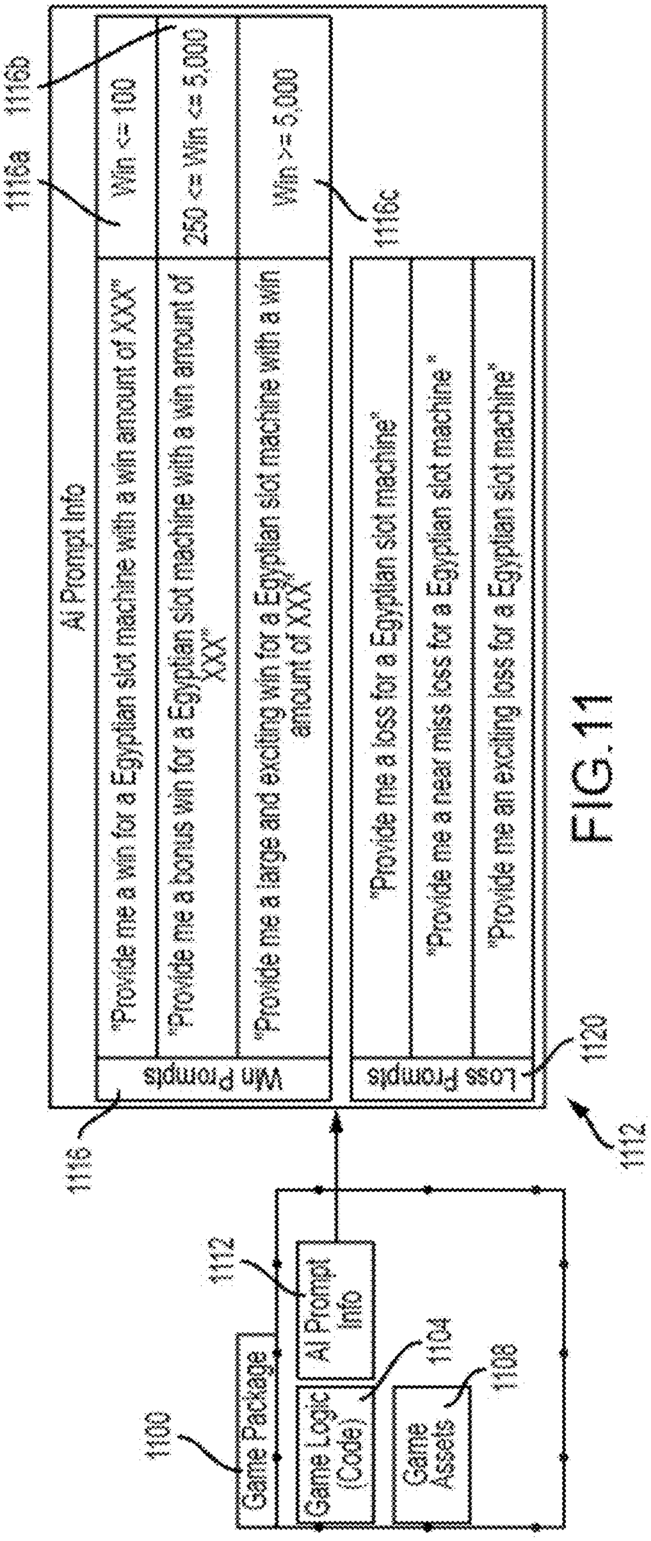
FIG. 11 is a block diagram illustrating gaming application loading onto a gaming device in accordance with aspects of the present disclosure.

FIG. 11 depicts an embodiment in which a game package 110 is installed on the gaming device 108. The game package 1100 contains not only game logic or code 1104 and game assets 1108 but also one or more prompts 1112. By way of illustration, the one or more prompts 1112 can comprise both predetermined outcome=win prompts 1116 and predetermined outcome=loss prompts 1120. Each win prompt 1116*a-c* is associated with additional data such as the conditions on when to use the prompt. In this example, first, second, and third prompts 1116*a-c* are each associated with a different award amount such that the award amount of the predetermined outcome determines which prompt to use.

In other embodiments, more complicated conditions can be associated with each win or loss prompt such as one or more of: a win streak defined as a specified number of consecutive wins, a loss streak defined as a specified number of consecutive losses, a group of prompts to randomly choose from using an RNG/PRNG, such as 10 different prompts to use for wins less than or more than a threshold award (e.g., $100), an indication if the prompt should be re-used (which would require the gaming system 100 to track when each prompt was last used to enable a selected prompt to be reused only after all other prompts have been used (e.g., out of all prompts possible or all prompts eligible for the particular scenario) to avoid repetitive content from being shown), a player account or loyalty status or point level (e.g., club members are treated differently from non-members such as using the exemplary prompts of "Provide me a video of an exciting win and show that the player has over 10,000 points and can get a free buffet with those points"), player play history (e.g., as exemplified by the prompts: "Provide me a video of a win and do something interesting because the player is on a 5-game win streak" or "Provide me a video of a win for an Egyptian slot game. The player normally likes Poker but is now playing slots, so include something about Poker", player casino use history (e.g., the gaming system could notice the player has not used a certain service of the casino and work that into the AI prompt such as when the player is tired and the prompt is "Provide me a video of a loss for a tired player suggesting they visit the coffee shop"), application of a randomness parameter to make a certain prompt more or less likely to be chosen, and the like. As will be appreciated, use of a given prompt can be made contingent upon an endless variety of additional or other conditions depending on the application.

Continuing the example of FIG. 11, the "XXX" in the prompts 1116 is optional, but when used the gaming system knows to replace the "XXX" with the amount of the win or other relevant context information. Likewise, any hints or additional information from the gaming server 116 could be used, such as the gaming server 116 indicating that a bonus or progressive is being awarded.

While for the three loss prompts 1120, no additional data is shown, it is to be appreciated that contingent conditions and contextual information may be employed in the same manner as employed in the first, second, and third win prompts 1116*a-c*. For example when the player 112 is facing a losing streak, such as losing 5 games in a row, the loss prompts might attempt to produce more exciting or interesting display to keep the player interested. For example, assuming that the player is on a 10-game losing streak the prompt could be: "Create a video with sound that is funny and makes light of the fact that the player is losing a lot, but a win might be right around the corner". Or maybe include in the prompt something like "Encourage the player that the losing streak will come to an end".

As will be appreciated, the prompts are stored on the gaming server 116 rather than the gaming device 108. This configuration can assist in updating and managing prompts without changing the game packages.

In some embodiments, the prompt includes information about the player's profile or player's emotional or mood state. For example, the gaming system might know a player's address, age, social media posts, etc. and the gaming system could use that information in the prompts. This could result in prompts such as "Create me a big win for a Raiders fan" because the system knows the player likes the Raiders based on their social media presence.

In some embodiments, the prompts include player provided information. For example, the game prompt might be "Provide me an exciting win for a Cleopatra slot game win of $1,000". The player might provide the text "tone down the colors" and result in the prompt "Provide me an exciting win for a Cleopatra slot game win of $1,00. Tone down the colors". The player might request a different theme (different from Cleopatra), different style (Egyptian), more movies, different sounds (include rock music), details related or associated with a holiday, an event at the casino (ex: concert, performer, etc), etc.

Figure 12A:
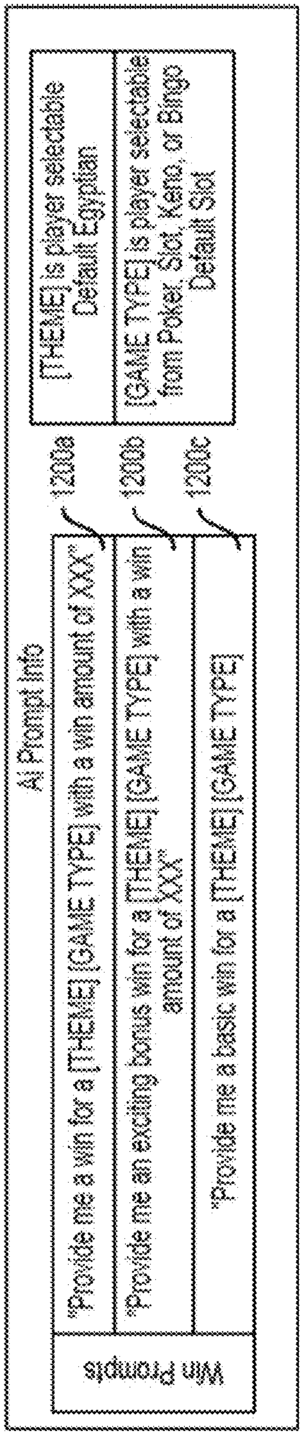
FIG. 12A is a block diagram illustrating player selectable content prompts in accordance with aspects of the present disclosure.

FIG. 12A shows an example of player selectable prompts 1200*a-c*. The player can input any theme he or she wants into the [THEME] field but the default field value is "Egyptian". The player can choose any game type in the [GAME TYPE] field, but only from the list, and the default field value is a slot game. This is a very simple example, and the rules and prompts are likely to be more complicated. For example, the prompt might be "Provide me a video. The win is large. The theme is Egyptian. The game type is slot." Employing player selectable fields can make the assembly of the player selectable information easier to manage.

In some applications, the system requests auto-generated content by providing prompts to a generative model hosted by the central determination gaming system 100. The prompt could be as simple as "provide me a video of something entertaining for a $400 win" or "provide me a video of something entertaining for a loss". Such general prompts could create wildly variable content. To provide better content, a prompt, such as "A player is going to play a slot game themed in the time of Cleopatra in ancient Egypt. Generate me an entertaining display for a win of 75", would be preferred.

Figure 9:
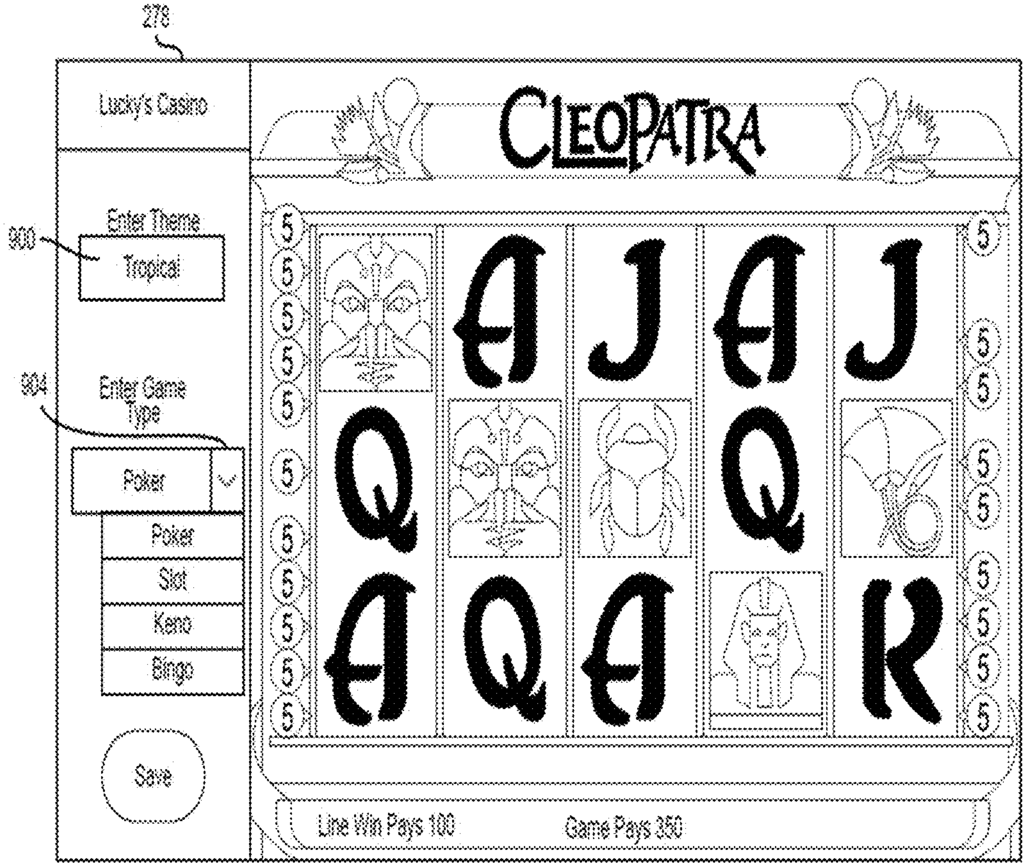
FIG. 9 is a screenshot of a gaming device display rendering a user interface of inputted player preferences in accordance with aspects of the present disclosure.

In another example in accordance with at least some embodiments of the present disclosure, the player can explicitly enter his or her content preferences to be used in auto-generation of content. FIG. 9 shows an embodiment where the player enters the prompt information using the service window 278. The service window is a web based (likely HTML) application of the host system, and this embodiment therefore would have the gaming server 116 controlling the generative content generation instead of the gaming device. Referring to FIG. 9, the player has typed the text "Tropical" in the field 900 for the theme and picked "Poker" from the drop down list 904 of Class 2 game types possible (which are shown as poker, slot, keno, and bingo).

The ability for a player to adjust prompts might be purchased with money, promotional credits, player points or virtual points. The functionality might be limited to certain players such as high rollers or player club members. The feature might be limited in use such as only allowing the player to adjust the prompts once per hour. In another example, the triggering of the event depends on the player loyalty status and/or the player loyalty status determines how many content auto-generation events are available to the player.

In an example in accordance with at least some embodiments of the present disclosure, the player content preferences may be generated from sensor 145 feedback, such as images from cameras. The casino, casino or mobile applications can capture pictures or videos of the players and identify aspects of the players. For example, a first player can be wearing a Las Vegas Raiders shirt, and in response the gaming system determines that the first player likes football, the Raiders, and/or sports and generates a content preference accordingly. For instance, the gaming system might create the prompt "football" based on this information. Returning to the example above, if the second player were also in the defined football-game themed area with the first player, a prompt and image such as that in FIG. 7 could be generated for use in a presentation operation of the gaming devices in the area.

The prompt could include information about the player's mood and include that in the prompt. The mood could be determined by using facial recognition cameras or other types of sensors 145 on the gaming device 108. This could result in prompts such as "Create me a loss animation that cheers up a player that is mad about losing". FIG. 12B shows how mood could be a condition for the win and loss prompts 1250 and 1254. The figure is simplified and the conditions are likely more expansive as previously described.

In one embodiment, the gaming server 116 additionally provides award amounts such that it uses the same prompt multiple times for multiple amounts. For example, the gaming server knows it has awards of $100, $125, and $175 for the game, so it provides three requests to the generative model using the "same" prompt as shown by the following examples: "Provide me a video for a slot win of 100", "Provide me a video for a slot win of 125" and "Provide me a video for a slot win of 175. As shown, the win amount is a field that is populated by the appropriate award, with the other fields of the prompt being the same.

In another example in accordance with at least some embodiments of the present disclosure, the player is able to trigger auto-generation because he or she is determined to be eligible for a content generation event.

The information used in the prompt to auto-generate the content can be used to provide each player with unique auto-generated content, thereby providing each player with a customized experience. In an exemplary embodiment, the auto-generated content is based on the player's social media information from the social media server(s) 188, which is incorporated into the prompt. In an exemplary embodiment, the auto-generated content uses the player's activity (such as gameplay information or loyalty activities) in the casino to generate the prompt. In an embodiment, the prompt comprises images or sounds from the player's Facebook™ account and incorporates the player's images or sounds into the auto-generated content.

In some embodiments, the prompts are wild and do not even follow something structured like a slot machine configuration. The prompts could be "Give me an exciting video you've never shown me before" and just see what happens. This might, for example, generate a funny video of somebody doing a backflip off a bridge and is exciting. Of course, the level of success of each prompt would be monitored, by monitoring game play, and the prompts would be adjusted so that the resulting content generates the best player experience.

While the various examples herein focus on textual content preferences and prompts and auto-generated images, it is to be understood that the content preferences, prompts, and auto-generated content can be in any form, including not only text but also images, videos, lighting colors and sequences, and sounds.

While the various examples herein simplistically use content preferences, prompts and auto-generated images, it should be appreciated that content preferences, prompts, and auto-generated content can be much more complex and include multiple types of media as well as style, content suggestions, colors or color scheme, a composition, an attribute of a picture, an animation or sound created by the generative model, and the like. These increasingly complex examples can require more complex user interfaces and logic to build the prompts from the content preferences with artificial intelligence being an example of such complex logic.

In another example in accordance with at least some embodiments of the present disclosure, the player can choose whether to use normal gaming content or the auto-generated content for one or more presentation operations. Similarly, in an exemplary embodiment the player can choose which presentation operation(s) from among plural presentation operations are to be used for selected auto-generated content particularly when more than one auto-generated content set is available.

In another example in accordance with at least some embodiments of the present disclosure, the player is able to "delete" or remove the auto-generated content from the gaming system such that it is not available for use.

In another example in accordance with at least some embodiments of the present disclosure, the player is prompted to "approve" the auto-generated content before it is used in the gaming device. The content is first be approved by the player before it can be rendered by the gaming device to ensure that the player approves of the auto-generated content. This can be important when using the player social media information in the auto-generated content.

In another example in accordance with at least some embodiments of the present disclosure, the player can opt out of any auto-generated content. The opt out selection could be associated with the player's profile such that the gaming server knows that the player does not wish to use auto-generated content in a gaming session.

In some embodiments, the use of auto-generated content in a slot game, poker game, etc, may not occur under all circumstances. For example, auto-generated content may only be used for wins over a certain threshold. In another embodiment, auto-generated content may be mixed or combined with existing, traditionally generated and otherwise static content. For example, the reel symbols and all art related to win amounts in a slot game may be fixed or statically generated, whereas auto-generated content may be played after the win to congratulate the player for their win.

The disclosure has focused on retrieving and displaying AI content. However, the gaming device will still need to display non-AI (or not entertainment) content, such as the Bingo card, horse race outcome, credit meter, door open status, errors, tilts, etc. In other words, the gaming device will render not only auto-generated content but also standard content generated by the game logic and not by the generative model.

Figure 16:
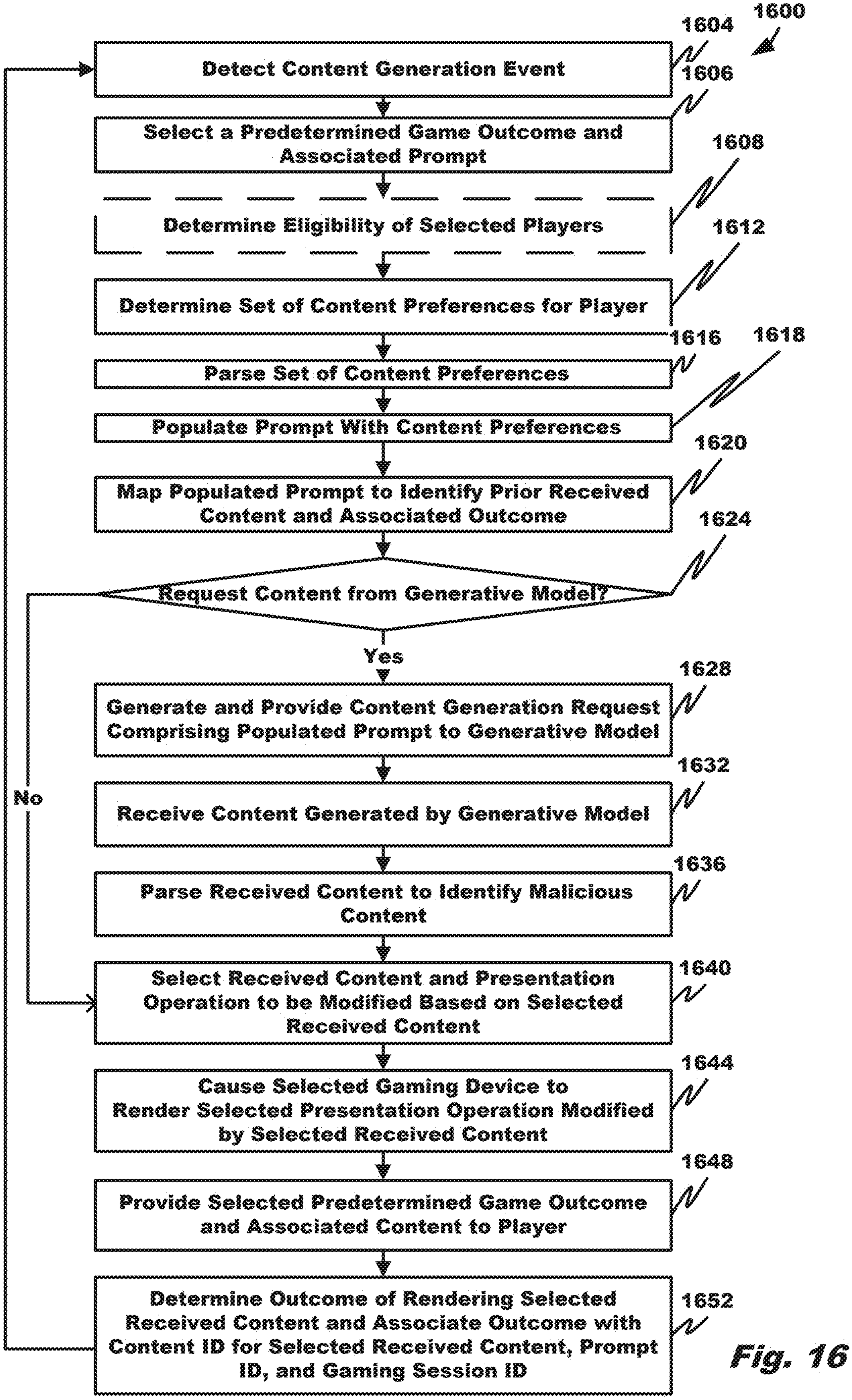
FIG. 16 is a process flow illustrating aspects of content generation in accordance with aspects of the present disclosure.

The process flow will be discussed with reference to FIG. 16. FIG. 16 illustrates an example of a process flow 1600 that supports aspects of the present disclosure associated with the generative model 180 interacting with players 112 via the gaming system 116, communication devices 144 and/or gaming devices 108. The process flow 1600 supports aspects of the present disclosure associated with autogenerating appropriate content. In some examples, process flow 1600 may implement aspects of gaming system 100. Further, process flow 1600 may be implemented by a gaming system 100 or components included therein as described with reference to FIGS. 1 through 3.

In the following description of the process flow 1600, the operations may be performed in a different order than the order shown, or the operations may be performed in different orders or at different times. Certain operations may also be left out of the process flow 1600, or other operations may be added to the process flow 1600. It is to be understood that any device (e.g., a gaming device 108, a gaming server 116, a communication device 144, components of the system 100, etc.) may perform the operations shown.

Referring now to FIG. 16, a method of using the generative model(s) to autogenerate content for modification of presentation operations of the gaming system will be described in accordance with embodiments of the present disclosure.

The method begins when the gaming server 116 detects a content generation or trigger event to generate content (step 1604).

The method continues by the gaming server selecting a predetermined game outcome and an associated prompt to include in a content generation request to a generative model to generate content (step 1606).

The method continues by optionally determining whether a selected player associated with the trigger event is eligible to have content preferences used in auto-generating content (step 1608). Eligibility can be based, for example, on successfully authenticating that the authorized player is using the communication device 144 or gaming device 108, determining that the player has content preferences that may be used in auto-generating content, and determining that the player has not opted out of permitting his or her content preferences to be used or in using auto-generated content in a gaming session. Authentication can be done by any suitable authentication techniques, such as single use passwords or passcodes, digital certificate, image recognition by gaming system camera still or video images, and other knowledge-based, physiological biometrics-based, behavioral biometrics-based, and two/multi-factor authentication techniques.

The method continues by determining a set of content preferences for the selected player, including player and operator input (step 1612).

The method continues by parsing the set of content preferences for the selected player or group of players to identify malicious content (step 1616).

The method continues by populating the prompt with selected preferences from the parsed set of content preferences (step 1618).

After filtering out any content preference in the set comprising potential malicious content and selecting the content preferences to be used in the prompt, the method continues by the gaming system mapping the set of group preferences to other sets of group preferences to identify prior received content and associated outcomes (step 1620). The comparison can be done by parsing selected content preferences in the current set against selected content preferences in prior sets of content preferences. The comparison is assigned a similarity indicator indicating a level of similarity. Only compared sets of preferences having at least a threshold level of similarity are determined to be similar.

The method continues in decision diamond 1624 by determining, from the mapping of step 1620, whether or not to request new content from the generative model. Generally when the filtered set of preferences maps (or has at least a predetermined level of similarity to) to a prior set of preferences used in a prompt and therefore content previously generated using the prompt and the content has an associated outcome that has at least a threshold level of success, the gaming system 116 proceeds to step 1640 (discussed below) using the previously generated content in lieu of new content. When the set of preferences does not have at least a predetermined level of similarity to a prior set of preferences or the previously generated content identified by the mapping does not have at least a threshold level of success, the gaming system proceeds to step 1628.

The method continues by generating and providing a content generation request comprising a prompt to the generative model (step 1628). The prompt is generated using any of the techniques described above. Once the set of content preferences is selected, the prompt is constructed from the selected set, the predetermined outcome, and game theme and included in the content generation request. The content generation request is sent to the generative model or generative model.

The method continues by receiving autogenerated content from the generative model (step 1632).

The method continues by parsing the received content to identify malicious content or otherwise undesirable content that might violate one or more prohibited content rules of the gaming system (step 1636).

After filtering out any received content comprising potential malicious content, the gaming system saves the filtered content in association with the prompt and selects, from among the plurality of sets of received content, received content and gaming device(s) and presentation operations to be modified based on the selected received content (step 1640). In some applications the gaming system selects multiple sets of received content from the plural sets and assigns each to a different presentation operation.

The method continues by causing the selected gaming device(s) to cause each of the selected presentation operations to be modified by the appropriate set(s) of received selected content (step 1644). This can be done by notifying the gaming device (shown as an EGM) that new content is available for an identified presentation operation.

The method continues by the gaming device providing the selected predetermined game outcome and associated content to the player (step 1648).

The method continues by determining the outcome of rendering selected received content and associating the outcome with a content ID for the selected received content and gaming session ID for the selected gaming device(s) and player(s) (step 1652) while the display(s) of the gaming(s) display the content. The gaming device records the history association with the content including the outcome and content ID.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, web browser, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central gaming server, central gaming controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A gaming system, comprising:

a communication interface;

a processor coupled with the communication interface; and a computer-readable storage medium coupled with the processor, the computer-readable storage medium comprising instructions that enable the processor to:

select a predetermined game outcome from a pool of predetermined game outcomes;

in response to selection of the predetermined game outcome, generate a prompt to a generative model, the prompt comprising input related to the predetermined game outcome;

receive content generated by the generative model based on the generated prompt;

select at least a portion of the received content for presentation as part of a game display configured to provide the selected predetermined game outcome; and cause the received content to be presented by a gaming device as part of the game display.

2. The gaming system of claim 1, wherein the content is presented during a gaming session on the gaming device, wherein the processor records the generated prompt, an identifier of the received content, a timestamp associated with presentation of the content, an identifier of the gaming session, and a player behavior indicator indicating a response of a player to presentation of the content as part of the game display, and wherein the player behavior indicator indicates a response of the player to content presentation.

3. The gaming system of claim 1, wherein the prompt and received content each comprise one of text, image, music, audio, and video information, wherein the generative model comprises one of a variational autoencoder (VAE), generative adversarial network (GAN), autoregressive model, and transformer-based model, and wherein the prompt comprises one of a content preference associated by a player profile with a player, a content preference associated with a social website posting of the player, a content preference received from a mobile device of the player, a game theme associated with the gaming device, a player activity detected by the gaming system, input received from the player, a captured image of the player, a loyalty level of the player, and a loyalty point balance of the player.

4. The gaming system of claim 3, wherein a content generation request comprising the generated prompt is provided to the generative model in response to detection of a content generation event, wherein the detected content generation event comprises one of successful authentication of a player by the gaming system, detection of a location of a mobile device associated with a player, detection of at least a threshold level of gameplay by a player, detection of occurrence of a predetermined state of the gaming system, detection of occurrence of a predetermined player loyalty activity by the gaming system, detection that gameplay on another gaming device currently presenting different selected content is below a threshold level of gameplay, detection that a presentation duration of the different selected content is at least a threshold duration, detection of a new content preference associated with the player, occurrence of a predetermined random or pseudorandom number, occurrence of at least a threshold loyalty point balance or loyalty status associated with the player, occurrence of predetermined clock setting, entrance of the player into a defined area of the gaming system, occupancy of at least a threshold number of players in the defined area of the gaming system, and departure of the player from the defined area of the gaming system.

5. The gaming system of claim 3, wherein the processor adjusts the prompt to reflect player input, wherein the prompt comprises a content preference associated with the player, wherein the game display comprises predetermined content in addition to the received content, wherein the processor maps the generated prompt to a library of previously received content, each previously received content in the library being associated with a corresponding prompt, to select the received content corresponding to the generated prompt, and wherein the processor periodically replaces the received content in the library with new received content from the generative model based on the corresponding prompt.

6. The gaming system of claim 5, wherein the content preference comprises a preference regarding one of a text, image, music, audio, color, style, animation, and video information, and wherein the processor, in generating the prompt, selects the prompt from a plurality of predetermined prompts, each prompt being associated with a different set of contextual parameters, each set of contextual parameters comprising a plurality of a number of consecutive wins, a number of consecutive losses, a player account status, a player loyalty status, a player gameplay history, an award amount, a game theme, an applicable law or regulation, a gaming system operator policy or restriction, and a player casino use history.

7. The gaming system of claim 1, wherein the processor causes the received content to be incorporated into content on a display portion separate from a display portion configured to render content of a gaming session, a sound emitted by the gaming device, an animation or avatar rendered by separate display portion, a shader rendered by the separate display portion, border, title, or frame rendered by the separate display portion, signage rendered by the separate display portion, and a message provided to a player by the gaming device, wherein in selecting the at least a portion of the received content, the processor selects a presentation operation from among plural presentation operations to be modified by the received content as part of the game display, and wherein the processor, in generating the prompt, randomly or pseudo randomly selects the prompt from a plurality of predetermined prompts.

8. The gaming system of claim 1, wherein the processor provides a content generation request comprising the generated prompt to the generative model after selecting the predetermined game outcome and wherein the generated prompt comprises a description of a location in the game display to render the received content.

9. A method, comprising:

selecting, by a processor, a predetermined game outcome from a pool of predetermined game outcomes;

in response to selecting the predetermined game outcome, generating, by the processor, a prompt to a generative model, the prompt comprising input related to the predetermined game outcome;

receiving, by the processor, content generated by the generative model based on the generated prompt;

selecting, by the processor, at least a portion of the received content for presentation as part of a game display configured to provide the selected predetermined game outcome; and causing, by the processor, the received content to be presented by a gaming device as part of the game display.

10. The method of claim 9, wherein the content is presented during a gaming session on the gaming device and further comprising:

recording, by the processor, the generated prompt, an identifier of the received content, a timestamp associated with presentation of the content, an identifier of the gaming session, and a player behavior indicator indicating a response of a player to presentation of the content as part of the game display, wherein the player behavior indicator indicates a response of the player to content presentation.

11. The method of claim 9, wherein the prompt and received content each comprise one of text, image, music, audio, and video information, wherein the generative model comprises one of a variational autoencoder (VAE), generative adversarial network (GAN), autoregressive model, and transformer-based model, and wherein the prompt comprises one of a content preference associated by a player profile with a player, a content preference associated with a social website posting of the player, a content preference received from a mobile device of the player, a game theme associated with the gaming device, a player activity detected by a gaming system, input received from the player, a captured image of the player, a loyalty level of the player, and a loyalty point balance of the player.

12. The method of claim 11, further comprising:

providing, by the processor, a content generation request comprising the generated prompt to the generative model in response to detection of a content generation event, wherein the detected content generation event comprises one of successful authentication of a player by the gaming system, detection of a location of a mobile device associated with a player, detection of at least a threshold level of gameplay by a player, detection of occurrence of a predetermined state of the gaming system, detection of occurrence of a predetermined player loyalty activity by the gaming system, detection that gameplay on another gaming device currently presenting different selected content is below a threshold level of gameplay, detection that a presentation duration of the different selected content is at least a threshold duration, detection of a new content preference associated with the player, occurrence of a predetermined random or pseudorandom number, occurrence of at least a threshold loyalty point balance or loyalty status associated with the player, occurrence of predetermined clock setting, entrance of the player into a defined area of the gaming system, occupancy of at least a threshold number of players in the defined area of the gaming system, and departure of the player from the defined area of the gaming system.

13. The method of claim 11, wherein the prompt comprises a content preference associated with the player, wherein the game display comprises predetermined content in addition to the received content, and further comprising:

adjusting, by the processor, the prompt to reflect player input;

mapping, by the processor, the generated prompt to a library of previously received content, each previously received content in the library being associated with a corresponding prompt, to select the received content corresponding to the generated prompt; and periodically replacing, by the processor, the received content in the library with new received content from the generative model based on the corresponding prompt.

14. The method of claim 13, wherein the content preference comprises a preference regarding one of a text, image, music, audio, color, style, animation, and video information, and wherein generating the prompt comprises selecting, by the processor, the prompt from a plurality of predetermined prompts, each prompt being associated with a different set of contextual parameters, each set of contextual parameters comprising a plurality of a number of consecutive wins, a number of consecutive losses, a player account status, a player loyalty status, a player gameplay history, an award amount, a game theme, an applicable law or regulation, a gaming system operator policy or restriction, and a player casino use history.

15. The method of claim 9, wherein the processor causes the received content to be incorporated into content on a display portion separate from a display portion configured to render content of a gaming session, a sound emitted by the gaming device, an animation or avatar rendered by separate display portion, a shader rendered by the separate display portion, border, title, or frame rendered by the separate display portion, signage rendered by the separate display portion, and a message provided to a player by the gaming device, wherein selecting the at least a portion of the received content comprises selecting, by the processor, a presentation operation from among plural presentation operations to be modified by the received content as part of the game display, and generating the prompt comprises randomly or pseudo randomly selecting, by the processor, the prompt from a plurality of predetermined prompts.

16. The method of claim 9, wherein the processor provides a content generation request comprising the generated prompt to the generative model after selecting the predetermined game outcome and wherein the generated prompt comprises a description of a location in the game display to render the received content.

17. A gaming device, comprising:

a communication interface;

a display;

a user interface;

a processor coupled with the communication interface, display, and user interface; and a computer-readable storage medium coupled with the processor, the computer-readable storage medium comprising instructions that enable the processor to:

receive, by the communication interface, a predetermined game outcome selected from a pool of predetermined game outcomes;

in response to receiving the predetermined game outcome, generate a prompt to a generative model, the prompt comprising input related to the predetermined game outcome;

receive, by the communication interface, content generated by the generative model based on the generated prompt;

select at least a portion of the received content for presentation as part of a game display configured to provide the predetermined game outcome; and present, by the display, the received content as part of the game display.

18. The gaming device of claim 17, wherein the content is presented during a gaming session on the gaming device, wherein the processor records the generated prompt, an identifier of the received content, a timestamp associated with presentation of the content, an identifier of the gaming session, and a player behavior indicator indicating a response of a player to presentation of the content as part of the game display, and wherein the player behavior indicator indicates a response of the player to content presentation.

19. The gaming device of claim 17, wherein the processor incorporates the received content to be incorporated into content on a display portion separate from a display portion of the display configured to render content of a gaming session, a sound emitted by the gaming device, an animation or avatar rendered by separate display portion, a shader rendered by the separate display portion, border, title, or frame rendered by the separate display portion, signage rendered by the separate display portion, and a message provided to a player by the gaming device, wherein in selecting the at least a portion of the received content, the processor selects a presentation operation from among plural presentation operations to be modified by the received content as part of the game display, and wherein the processor, in generating the prompt, randomly or pseudo randomly selects the prompt from a plurality of predetermined prompts.

20. The gaming device of claim 17, wherein the prompt comprises one of a content preference associated by a player profile with a player, a content preference associated with a social website posting of the player, a content preference received from a mobile device of the player, a game theme associated with the gaming device, a player activity detected by a gaming system, input received from the player, a captured image of the player, a loyalty level of the player, and a loyalty point balance of the player, wherein the content preference comprises a preference regarding one of a text, image, music, audio, color, style, animation, and video information, and wherein the processor, in generating the prompt, selects the prompt from a plurality of predetermined prompts, each prompt being associated with a different set of contextual parameters, each set of contextual parameters comprising a plurality of a number of consecutive wins, a number of consecutive losses, a player account status, a player loyalty status, a player gameplay history, an award amount, a game theme, an applicable law or regulation, a gaming system operator policy or restriction, and a player casino use history.

* * * * *